(12) United States Patent
Stebbings

(10) Patent No.: US 6,961,850 B1
(45) Date of Patent: Nov. 1, 2005

(54) METHOD AND SYSTEM FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS

(75) Inventor: David W. Stebbings, Washington, DC (US)

(73) Assignee: Recording Industry Association of America, Washington, DC (US)

( * ) Notice: Subject to any disclaimer, the term of this patent is extended or adjusted under 35 U.S.C. 154(b) by 0 days.

(21) Appl. No.: 09/482,680

(22) Filed: Jan. 14, 2000

Related U.S. Application Data

(60) Provisional application No. 60/130,272, filed on Apr. 21, 1999.

(51) Int. Cl.[7] ............................................. G06F 11/30
(52) U.S. Cl. .................... 713/168; 713/200; 713/201
(58) Field of Search ............................... 713/168, 200, 713/201

(56) References Cited

U.S. PATENT DOCUMENTS

| | | | | |
|---|---|---|---|---|
| 4,658,093 A | * | 4/1987 | Hellman ........................ | 705/52 |
| 4,914,439 A | | 4/1990 | Nakahashi et al. ........... | 341/131 |
| 4,932,054 A | * | 6/1990 | Chou et al. .................... | 705/55 |
| 4,937,863 A | * | 6/1990 | Robert et al. ................ | 710/200 |
| 4,953,209 A | * | 8/1990 | Ryder et al. .................... | 705/59 |
| 4,977,594 A | * | 12/1990 | Shear ............................. | 705/53 |
| 5,319,735 A | | 6/1994 | Preuss et al. ................ | 395/2.14 |
| 5,652,626 A | | 7/1997 | Kawakami et al. .......... | 348/461 |
| 5,712,657 A | | 1/1998 | Eglit et al. .................... | 345/147 |
| 5,859,738 A | | 1/1999 | Forehand et al. ............. | 360/75 |
| 5,883,536 A | | 3/1999 | Patterson ..................... | 327/184 |
| 5,889,482 A | | 3/1999 | Zarubinsky et al. ......... | 341/131 |
| 6,233,684 B1 | | 5/2001 | Stefik et al. | |
| 6,411,772 B1 | | 6/2002 | Cookson et al. | |
| 6,438,692 B2 | | 8/2002 | Kato et al. | |

OTHER PUBLICATIONS

International Search Report, PCT/US00/10541.

* cited by examiner

*Primary Examiner*—Thomas R. Peeso
(74) *Attorney, Agent, or Firm*—Irah H. Donner; Wilmer Cutler Pickering Hale and Dorr LLP

(57) ABSTRACT

An improved embedded signaling apparatus and method of embedding data into audio signals occurring at substantially zero decibel levels is disclosed. Embedding is accomplished at such low inaudible levels by modifying an embedded signaling encoder with a dither generator, dither adder and dither subtracter that generates, adds and subtracts dither signals, of equal magnitude, to audio signals at specified bit rates. Because the dither signal is used substantially within the encoder and is substantially canceled before final output, the dither signal provides an additional signal level, depth or dimension in the absence of audio data. Thus, whenever music or other audio data that will ultimately become audible reaches a very low decibel level, such as during periods of silence on a CD, the effectiveness of embedding data into such low level signals is not impaired. The embedded signaling encoder of the present invention can also be used for authentication purposes.

51 Claims, 22 Drawing Sheets

METHOD AND SYSTEM FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS

RELATED APPLICATIONS

This application claims priority from U.S. Provisional Application Ser. No. 60/130,272, filed Apr. 21, 1999, which is incorporated herein by reference.

This application is also related to: U.S. application Ser. No. 09/315,104 entitled, "Data Disc Modulation for Minimizing Pirating and/or Unauthorized Copying and/or Unauthorized Access of/to Data on/from Data Media including Compact Discs and Digital Versatile Discs", filed May 20, 1999; U.S. application Ser. No. 09/315,102 entitled, "Modulation Method for Minimizing Pirating and/or Unauthorized Copying and/or Unauthorized Access of/to Data on/from Data Media including Compact Discs and Digital Versatile Discs", filed May 20, 1999; and U.S. application Ser. No. 09/315,012 entitled, "Method for Minimizing Pirating and/or Unauthorized Copying and/or Unauthorized Access of/to Data on/from Data Media including Compact Discs and Digital Versatile Discs, and System and Data Media for Same", filed May 20, 1999, all of which are hereby incorporated by reference.

FIELD OF INVENTION

This invention relates generally to anti-data pirating technology. More specifically, the invention relates to a method and system for preventing piracy and/or unauthorized access and/or unauthorized copying of data, such as audio and/or video data from a data source, such as compact discs (CDs), digital versatile discs (DVDs), hard drive discs, an Internet Service Provider (ISP), and other data discs and/or data sources via direct connection or via a local and/or global network, such as the Internet.

In accordance with the present invention, an improved apparatus and method of embedding data into audio signals such that the embedding process is successful even when audio signals occur at very low, inaudible levels, is provided. Specifically, an exemplary embodiment of the present invention includes an embedded signaling encoder equipped with a dither generator, adder and subtracter. The dither signal is used partially, substantially or completely within the encoder and is partially, substantially or completely canceled or eliminated before output. The advantages of dithering include increased stability. Thus, whenever music or other audio data that will ultimately become audible, such as videos, movies, etc., reach a very low decibel level, the effectiveness of embedding data into such low level signals is not impaired.

BACKGROUND OF THE INVENTION

There are two basic methods for recording sound and music—analog and digital. See e.g. Ken C. Pohlmann, "The Compact Disc: A Handbook of Theory and Use", THE COMPUTER MUSIC AND DIGITAL AUDIO SERIES, Vol. 5 (1988). The above-mentioned audio series, which was published by A-R Editions, Inc., in Madison, Wis., is, along with all volumes therein, incorporated herein by reference.

In analog recording, the recording medium (a tape) varies continuously according to the sound signal. In other words, an analog tape stores sound signals as a continuous stream of magnetism. The magnetism, which may have any value within a limited range, varies by the same amount as the sound signal voltage.

In digital recording, the sound signal is sampled electronically and recorded as a rapid sequence of separately coded measurements. In other words, a digital recording comprises rapid measurements of a sound signal in the form of on-off binary codes represented by ones and zeros. In this digital system, zeros are represented by indentations or pits in a disc surface, and ones are represented by unpitted surfaces or land reflections of the disc, such that a compact disc contains a spiral track of binary codes in the form of sequences of minute pits produced by a laser beam.

Music that is input to a digital recording and the requisite series of reproduction processes, must pass through the recording side of a pulse code modulation (PCM) system. A master recording of the music is stored in digital form on a magnetic tape or optical disc. Once the magnetic tape has been recorded, mixed and edited, it is ready for reproduction as a CD. The CD manufacturer then converts the master tape to a master disc, which is replicated to produce a desired number of CDs. At the end of the PCM system is the reproduction side, the CD player, which outputs the pre-recorded music.

If digital technology is used in all intermediate steps between the recording and reproduction sides of the PCM system, music remains in binary code throughout the entire chain; music is converted to binary code when it enters the recording studio, and stays in binary code until it is converted back to analog form when it leaves the CD player and is audible to a listener. In most CD players, digital outputs therefrom preserve data in its original form until the data reaches the power amplifier, and the identical audio information that recorded in the studio is thereby preserved on the disc.

For example, in Prior Art FIG. 1, disclosed in U.S. Pat. No. 5,319,735, incorporated herein by reference, the four major processing components of the information embedding process that may be described as a spread spectrum technique, are shown. The process begins when digital information, comprising a sequence of code symbols to be embedded in an audio signal, is derived as output of an error control encoder 2. The error control encoder here described is generally known in the art as a Reed-Solomon encoder, which functions to improve the reliability of information retrieval.

The resulting sequence of symbols is further encoded by a spread spectrum modulator 4, which operates to produce a code signal representing a sequence of code symbols. More specifically, for instance, each code symbol produced by spread spectrum modulator 4 is represented by a pseudo-random number sequence that is filtered and modified into successive code signal segments that correspond to successive code symbols that are detectable and distinguishable using a matched filter.

Code signal shaper 6 then modifies the code signal to produce a modified code signal having frequency component levels. At each time instant, the frequency component levels are basically a pre-selected proportion of the levels of the audio signal frequency components in a corresponding frequency range. This dynamically modified code signal is subsequently combined with the original audio signal using signal combiner 8 to produce a composite audio signal. As Prior Art FIG. 1 indicates, the composite audio signal is recorded onto a recording medium, such as a digital audio tape (DAT) or, via a transmitter, is subjected to a transmission channel, which may significantly distort and/or modify the composite audio signal. This concludes the information embedding process.

Reception or playback of the composite audio signal commences the information recovery process, as illustrated in Prior Art FIG. 2, which diagrams a conventional apparatus for recovering the digital information from a composite audio signal. Upon playback from a recording medium or receiver, the composite audio signal is transformed into an equalized signal by signal equalizer 10. The code signal detector and synchronizer 12 immediately detects the presence of the code signal in the newly transformed equalized signal, just as the spread spectrum demodulator 14 recovers the sequence of code symbols from the equalized signal. Consequently, an error control decoder 16, such as a Reed-Solomon decoder 16, recovers the signaled digital information from the sequence of code symbols.

Examining the spread spectrum modulator 4 in more detail, see Prior Art FIG. 3, each code symbol is input into a pseudo-random number sequence generator 18 where each possible input code symbol uniquely corresponds to a designated pseudo-random number sequence. By way of illustration, the collection of pseudo-random number sequences is stored in a lookup table so that each successive input code symbol selects a corresponding pseudo-random number sequence, which is produced by generator 18 by retrieving this pseudo-random number sequence from the lookup table. Alternatively, pseudo-random number sequence generator 18 may be designed as a special purpose circuit to dynamically produce the pseudo-random number sequences that correspond to successive input code symbols.

The pseudo-random number sequences fed to the unsampler 20 as a digital signal are then unsampled to a higher clock frequency. The resulting higher rate digital signal is low-pass filtered by low pass filter 22 in order to eliminate extraneous high frequency components. This process generates a baseband code signal that is frequency shifted to a signaling band by the frequency shift-to-signaling band 24. The signaling band, which ranges from 1890 Hz to 10710 Hz, lies within the bandwidth of the audio signal.

Another major component of the information embedding process, the code signal shaper 6, is now described in more detail in Prior Art FIG. 4. Here, the original audio signal (i.e. the music), into which the code signal is to be embedded, is manipulated by frequency analyzer 26, and is continuously frequency analyzed over a frequency band encompassing the signaling band. The energy calculation procedure 28 uses the result of this analysis to calculate a frequency distribution of the audio signal masking energy as it evolves over time. This frequency distribution of code signal energy is calculated by the relative masking level gain calculation procedure 30, which produces a set of gain values. Each gain value corresponds to a distinct frequency range within the signaling band.

At this juncture, the signal shaper 32 selectively filters and decomposes the code signal into component signals that occupy distinct frequency ranges. This is accomplished by using the gain values calculated by procedure 30 to adjust the levels of the corresponding component signals; these adjusted signals are then combined to produce the modified code signal. "The overall effect of this procedure is to produce a dynamically modified code signal with frequency component levels which are, at each time instant, essentially a preselected proportion of the levels of the audio signal frequency components in the corresponding frequency range." See U.S. Pat. No. 5,319,735, col. 6, lines 49–54.

Yet another major component of the information embedding process is the signal combiner 8, which is described in more detail in Prior Art FIG. 5. The signal combiner 8 comprises a signal delay 34 and a signal adder 36. The primary function of the signal delay 34 is to compensate for delays produced by the code signal shaper 6. Consequently, signal delay 34 delays the original audio signal. "This compensating delay temporally aligns the original audio signal with the modified code signal . . . when these two signals are added or combined in block [36] to form the composite audio signal." Id. at lines 63–68.

The frequency components of this alignment are illustrated in Prior Art FIG. 6. Here it is seen that the frequency distribution of the modified code signal energy basically parallels the frequency distribution of the original audio signal energy by a fixed offset, within the signaling band. The offset, which is measured in decibel (dB) units, is generally referred to as the Code to Music Ratio (CMR). The CMR is a preselected value that determines the ability to distinguish a composite audio signal from the original audio signal by listening. A conservative nominal design value for the CMR that renders a composite audio signal virtually indistinguishable from the original audio signal by listening, is –19 dB.

The fourth and final major component of the information embedding process is the error control encoder 2, as illustrated in more detail in Prior Art FIG. 7. A digital music source 38, which may be represented by an optical disc or a continuing stream of music information bits, is operated along with coded message 40, which represents the code signal to be embedded. The processing that occurs within the encoder, as at block 42, includes generating a continuing message sequence of 1s and 0s. The transmitted sequence may or may not be longer than the message sequence.

The processed message 40, generally composed of 16 bits and already frequency analyzed, enters an adjust gain device 44, which functions to adjust the original music signal and message 40 by employing an adding ratio of gain values. The resulting adjusted signal introduced into the signal combiner device 46 is output as a modified code signal 48 comprising the original music signal and the embedded message; this output 48 comprises 16 bits also.

Thus, generally when digital information, like music, is to be signaled for an embedding process, the digital information is transformed, using a conventional spread spectrum technique, into a modified code signal. Through the various processing steps of the spread spectrum technique, this code signal is modified in such a way that the modified code signal can be combined with the original digitized music information to form a composite audio signal that is indistinguishable from the original audio signal by normal listening.

At this point, the modified code signal can be recorded, or subjected to a transmission channel, that generally distorts and/or modifies the composite audio signal. The digital information, which is represented by a sequence of code symbols that is filtered and dynamically modified to be detectable by a matched filter, can then be recovered from the distorted and/or modified composite audio signal.

The following additional prior art patent represents the general state of embedded signaling, and is hereby incorporated by reference:

U.S. Pat. No. 4,914,439 to Nakahashi et al. discloses an analog to digital conversion system using dithering technology.

One problem basic to the above prior art references involves low level signals. For instance, when music or any audio signal, into which data is to be embedded, begins the information embedding process at a very low audio level, data and processing are generally added to the music signal at approximately −19 to −20 dB, which is already 20 decibels below music level. Thus, when the music level goes down to nearly zero, which can happen with high quality music on CDs, the problem of ineffective embedding is exacerbated; proper receipt of the music, as well as addition of the data to the music signal, is jeopardized.

Accordingly, I have determined that the above prior art methods are ineffective when the data being embedded together includes low level audio data. In addition, the above prior art references do not provide an inexpensive, easily adaptable and/or compatible system or method of embedding signals, particularly, for example, low level audio signals.

SUMMARY OF THE INVENTION

It is a feature and advantage of the present invention to provide a method and system of embedding data into audio signals that is effective when audio signals occur at very low, imperceptible decibel levels.

It is another feature and advantage of the present invention to provide a method and system of embedding data into audio signals, that is inexpensive and compatible with existing encoding devices.

It is another feature and advantage of the present invention to provide a method and system of embedding data into audio signals, that is manageable and practical in its implementation.

It is another feature and advantage of the present invention to provide a method and system of embedding data into audio signals, that does not require significant additional hardware and/or software in its implementation.

It is another feature and advantage of the present invention to provide a method and system of embedding data into audio signals, that is unreadable by the human eye and is indelible in the sense that it is permanent and, for all practical purposes, unalterable without damaging the data medium.

It is another feature and advantage of the present invention to provide a method and system of embedding data into audio signals, that can be advantageously used to prevent unauthorized access to data stored on/in a recording medium.

It is another feature and advantage of the present invention to provide a method and system of embedding data into audio signals, that uses and/or adapts existing hardware and/or software within, for example, an encoder that can facilitate preventing unauthorized copying.

The present invention relates to a method and apparatus for embedding data into, for example, imperceptibly low and/or zero or substantially zero decibel audio signals. Generally, data are embedded into audio signals occurring at normal audible levels. However, when decibel levels drop outside of audible ranges, prior embedding processes become ineffective.

Consequently, a feature and advantage of the present invention is to provide an effective, unimpaired embedded signaling apparatus and method at imperceptibly low decibel levels. The present invention is based, in part, on my discovery of an improvement to allow data or a message to be added to an audio signal, such as music, even when the music falls completely to zero decibel in, for example, a normal 16-bit or 24-bit system. Moreover, the present invention uses conventional hardware and/or software in encoders that may be adapted in one or more ways described below.

The above features and advantages are accomplished generally by transforming lower bit symbols into higher bit symbols using an improved encoder that has been modified, for example, with a dither generator, adder and subtracter. The dither generator/adder/subtracter generates, adds and subtracts dither signals to/from audio signals at specified bit rates. Other standard devices may be used to perform the overall processes described herein.

The substantially random digital dither signal output by the dither generator is essentially transparent to the user, like white noise. The dither generator delivers the dither signal both to the adder and to the subtracter. The dither signal is generally used within the embedded signaling encoder and is substantially canceled before output.

The triple input of data at, for example, the dither adder, as will be herein described, is a major departure from the signal combiner function generally performed in conventional encoders. Effectively, this means that the dither signal generated by the dither generator provides an additional signal level, depth or dimension in the absence of music. So, instead of disappearing at very low decibel levels, the embedding process now functions by contributing to the output of a composite audio/dither signal containing the audio signal and embedded message.

Advantageously, the final output signal can be truncated or reduced to a lower number of bits, and still contain the original audio signal as well as the embedded message. Truncation is optionally accomplished by conventional means.

The improved encoder of the present invention can also be used for authentication purposes in order to prevent unauthorized access to the data, such as in instances when the embedded message contains one or more authentication keys.

Singular or multi-level authentication systems may be used for preventing unauthorized copying of audio data on a disc, for example. Similarly, two or three different authentication or decryption systems, each of which successively must be decrypted before the audio is finally available, may be used.

Moreover, the authentication keys contained in embedded message(s) can optionally use three or four different sources for making or compiling a long key or compound keys. In other words, instead of having a multi-layered decryption or authentication system, an optional multi-level decryption key can be used, each component of which must be found in order to build the whole key to perform the entire decryption or authentication process.

Another feature of the present invention is the combinative use of various authentication methods for either generating an authentication key having two or more components, or for accessing the key buried in two or more places on/in the data medium, such as an optical disc, electronic file, etc.

Alternatively, one authentication method may generate an authentication key that indicates a random location on a disc where a second authentication key or code is located, and so forth. That is, one method may be used as an address pointer to locate a second authentication key. The address pointer may be programmed into the table-of-contents area on a disc. The second authentication key, optionally in combination with the first authentication key, may then be used in the authentication process.

Yet another alternative involves using one authentication method to generate an authentication key that validates a second key/code, which can be optionally generated using a different method. Additional keys and/or components may also be generated or used.

A further advantage of the present invention is that a message, containing one or more authentication keys, can optionally be embedded into a music data media, such as a compact disc, on a per track basis, or at intervals throughout the disc. This means that the same type of authentication process may be performed for each track to be played, or may be performed throughout the playing/recording process. Thus, it is important to note that each track of a CD, for example, can optionally include a different authentication or decryption key.

Moreover, another feature of the present invention is that a message, containing one or more authentication keys, can optionally be embedded into a music data source, such as an electronic file.

To achieve these and other objects, the present invention provides a computer program product that stores computer instructions thereon for instructing a computer to perform a process of authenticating a data source/media as fraudulent/pirated or non-fraudulent. An exemplary data source/media may include a CD or DVD or electronic file, having an embedded message containing one or more authentication keys.

In accordance with the first embodiment of the invention, an embedded signaling encoder embeds data into audio signals, optionally stored on a data medium, occurring at substantially inaudible levels. The improved encoder comprises six major components.

The first component is a processing device configured to receive code signals. At least one of the code signals includes the data to be embedded in the data medium. The processing that occurs within the processing device also includes frequency analyzing code signals.

The second component is an adjust gain device, which is operably connected to the processing device. The adjust gain device is configured to adjust code signals, including an original audio data and the data to be embedded, by employing an adding ratio of gain values.

The third component is a bit stuffing adder, which is serially operably connected to the processing device, and which is configured to transform audio data, like an original audio signal, from a lower bit signal to a higher bit signal, such as from 16 bits to 24 bits.

The fourth component is a dither generator, which is operably connected to a dither adder and to a dither subtracter. The dither generator delivers two random digital dither signals of substantially equal magnitude that is an input each to the dither adder and the dither subtracter, respectively. The dither generator is configured to produce, at predetermined bit rates, dither signals, which are used within the embedded signaling encoder and are substantially canceled before output of the final output signal.

The fifth component is the dither adder, which operably connects the bit stuffing adder, the adjust gain device and the dither generator at a triple input of data. Accordingly, the dither adder combines an original audio signal produced by the bit stuffing adder, a dynamically modified code signal produced by the adjust gain device, and a modulated dither signal produced by the dither generator, as a triple data input. The triple data input at the dither adder departs from the signal combiner function generally performed in conventional encoders. The dither adder then produces a singular composite audio dither signal comprising both the original audio signal and the embedded data.

The sixth major and final component is the dither subtracter, which is operably connected to both the dither generator and the dither adder. The dither subtracter is configured to receive the composite audio dither signal from the dither adder, and to receive a modulated dither signal, of substantially equal magnitude as the dither signal inputted to the dither adder, from the dither generator. The dither subtracter removes the modulated dither signal from the composite audio dither signal and produces a final output signal comprising the original audio data and the embedded data. The audio data is substantially audible to a user and the embedded data is substantially inaudible to a user.

The embedded signaling encoder may advantageously comprise a bit truncation device, which may optionally be operably connected to the dither subtracter. The truncation device reduces the bit signal of the final output signal to a lower bit signal still comprising the original audio data and the embedded data. Additionally, the embedded data may comprise at least one authentication key or component thereof used to prevent piracy and/or unauthorized access and/or unauthorized copying of the data.

In accordance with a second embodiment of the invention, a method embeds data into audio signals occurring at imperceptibly low and/or inaudible levels. The method includes the following sequential, non-sequential and/or sequence independent steps of generating or accessing an original audio signal and a message to be embedded into the original audio signal, and transforming the original audio signal from a lower bit signal to a higher bit signal. The method also includes optionally concurrently or simultaneously with the transforming of the original signal, processing the message and/or original signal to be represented by, or converted into, a set of gain values in order to produce a dynamically modified code signal, and combining all three original audio signal, dynamically modified code signal, and a modulated dither signal to produce a composite audio dither signal. The method also includes removing or subtracting the modulated dither signal from the composite audio dither signal, and outputting a final output signal comprising substantially the original audio signal and the embedded message, as at least one of audio, video, audio data, video data and digital data.

The method of this embodiment optionally further includes the step of converting an original audio signal, such as a music data source, composed of 16 bits, into channel bit patterns composed of 24 bits. The method also optionally includes the step of selecting one form of data from a group comprising an optical disc, an electronic file, an intra-network and an inter-network.

The processing step optionally includes spread spectrum modulation and code signal shaping of the original audio signal and/or the data to be embedded. And the removing or subtracting step further includes the step of removing or subtracting from the composite audio dither signal, a dither signal equal or substantially equal in magnitude to the dither signal inputted into the dither adder. The combining step further includes producing a composite audio dither signal having an amplitude that is at least substantially proportional to a sum of the original audio signal, the modified code signal and the modulated dither signal.

The method according to the second embodiment optionally further includes the step of truncating the bit signal of the final output signal from a higher bit signal to a lower bit signal comprising substantially the original audio signal and the embedded data. The method also includes the steps of introducing into the embedded data at least one authentication key or component thereof, for preventing piracy and/or unauthorized access and/or unauthorized copying of the embedded data; and authenticating the embedded data via at least one authentication key or component thereof contained in the data embedded during substantially inaudible levels.

The method according to this embodiment also includes the step of authenticating the embedded data via at least two different authentication keys or components thereof contained in the embedded data. Here, each authentication key or component thereof successively must be authenticated before the embedded data is finally output in the final output signal. The method further includes the step of authenticating the embedded data over a plurality of interconnected computer networks comprising at least one of a local network, global network and Internet.

The authenticating step further includes detecting at least one authentication key or component thereof contained in the embedded data, comparing the embedded authentication key or component thereof to at least one authentication key or component thereof, and outputting the embedded data as either audio, video, audio data, video data and digital data, substantially free of each authentication key or component thereof, before the embedded data is output in the final output signal.

In accordance with a third embodiment of the invention, a method authenticates a media and/or data stored on the media, in order to prevent piracy and/or unauthorized access and/or unauthorized copying of the data stored on the media. The media contains at least one authentication key or component thereof in or as data embedded during, for example, imperceptibly low inaudible levels, for authenticating whether the media and/or data is authorized. The data may optionally be embedded in audible data as well.

The method includes reading the data, including the embedded data, from a media, and detecting the embedded data including at least one authentication key or component thereof. The method also includes comparing at least one authentication key or component, to at least one predetermined authentication key or component, and authenticating the media and/or data responsive to the above comparing step. The method also includes outputting the data as audio, video, audio data, video data and/or digital data, including the embedded data, without substantially affecting the audio, video, audio data, video data and/or digital data, or the audible characteristics thereof.

In the method of this embodiment, the detecting step further includes deriving the embedded authentication key or component thereof as a combination of on-off binary codes representing ones and zeros to represent a predetermined pattern. The method additionally includes locating the embedded data on a track and/or interval basis throughout the media such that authenticating is performed for each track to be played and/or throughout playback and/or throughout recording.

Additionally, the authenticating step may be accomplished by using a different authentication key or component thereof for each disc track. Authenticating the embedded data and/or the media may also be accomplished via at least two different authentication keys, each of which successively must be authenticated before the embedded data is finally output via the outputting step.

The method of this embodiment also includes using a process defined in reading, detecting, comparing, authenticating and/or outputting steps described above, as a multi-level authentication system comprising at least two different authentication keys or components, each of which successively must be authenticated before the embedded data is output in a final output signal. The method optionally authenticates the embedded data and/or media over a plurality of interconnected computer networks including a local network and/or a global network and/or the Internet.

In the method of this embodiment, the authenticating step, which is responsive to the comparing step, further includes using at least three different sources for compiling long or compound authentication keys or components thereof. The deriving step further includes decoding and/or decrypting the embedded authentication key or component thereof. In addition, the comparing step further includes comparing an authentication key or component thereof contained in the embedded data, to a table of valid authentication keys or components thereof.

The embedded data includes information relating to a music originator, a music title, group of music titles, lot number, batch number, shipper, recipient, shipping date, manufacturer identity, manufacturing date and/or designated or other predetermined data purpose.

According to a fourth embodiment of the invention, a data disc is used in a method for authenticating a media and/or data stored on the media in order to prevent piracy and/or unauthorized access and/or unauthorized copying of the data stored on the media. The data disc comprises a media that contains at least one authentication key or component in data embedded during, for example, substantially inaudible levels and substantially corresponding to the audible levels of the data, for authenticating whether the media and/or data is authorized. The embedded data and/or media is optionally authenticated on at least a per track and/or interval basis throughout the media. Each authentication key or component does not substantially interfere with the data when output.

According to a fifth embodiment of the invention, a data message comprises media that contains at least one authentication key or component in data embedded during, for example, substantially inaudible levels and substantially corresponding to the audible levels of the data, for determining whether the media and/or data is authorized or authentic. The data message is used in a method for authenticating a media and/or data to be stored on the media, in order to prevent piracy and/or unauthorized access and/or unauthorized copying of the data stored on the media. Authentication optionally occurs on at least a per track and/or interval basis throughout the media. Each authentication key or component does not substantially interfere with the data when output.

According to a sixth embodiment of the invention, an embedded signaling encoder for embedding data into audio signals occurring, for example, at substantially inaudible levels, is disclosed. The encoder is useful for authenticating a media and/or data stored on the media in order to prevent piracy and/or unauthorized access and/or unauthorized copying of the data stored on the media. The embedded data contains at least one authentication key or component thereof.

The embedded signaling encoder of this embodiment includes processing means for receiving and frequency analyzing code signals. At least one of the code signals include the data to be embedded. The embedded signaling encoder also includes adjusting means for adjusting the frequency analyzed code signal in producing a dynamically modified code signal, and bit stuffing adding means for transforming an original audio signal from a lower bit signal into a higher bit audio signal.

The embedded signaling encoder also includes dither generating means for generating at least two random digital dither signals, each of substantially equal predetermined bit rate and each of substantially equal magnitude, as input signals each to a dither subtracting means and a dither adding means. The encoder further includes dither adding means for combining the original audio signal, the dynamically modified code signal and the dither signal as a triple data input, and for producing a singular composite audio dither signal; and dither subtracting means for removing the dither signal from the composite audio dither signal before producing a final output signal comprising the original audio signal and the embedded data.

The processing means optionally performs spread spectrum modulation and code signal shaping of the original audio signal and/or data to be embedded. The dither adding means further produces a composite audio dither signal having an amplitude that is substantially proportional to a sum of the original audio signal, the dynamically modified code signal and the dither signal.

The embedded signaling encoder of this embodiment optionally includes truncating means for reducing the bit signal of the final output signal to a lower bit signal still comprising substantially the original audio signal and the embedded data.

According to a seventh embodiment of the invention, a method of embedding first data of a first bit length within second data of a second bit length, and transmitting the first and second data in a data stream, is disclosed. The method includes the following sequential, non-sequential and/or sequence independent steps of combining third data of a third bit length with the second data of the second bit length into fourth data of a fourth bit length. The fourth bit length substantially comprises the combined lengths of the second and third bit lengths.

The method also includes encoding the second data into fifth data of a fifth bit length of a substantially similar length as the second bit length, and gain adjusting the fifth data into sixth data of a sixth bit length of a substantially similar length as the second bit length, and combining the sixth data, the fourth data and seventh data of a seventh bit length of a substantially similar length as the fourth bit length into eighth data.

This method also includes subtracting the seventh data from the eighth data producing ninth data of a ninth bit length of a substantially similar length as the fourth bit length and including the first data embedded therein, truncating the ninth data into tenth data of a tenth bit length having a length substantially similar to the second bit length and included the first data embedded therein, and outputting the tenth data with the first data in the data stream.

According to an eighth embodiment of the present invention, a method of embedding first data of a first bit length within second data of a second bit length and transmitting the first and second data in a data stream, is disclosed. The method includes the following sequential, non-sequential and/or sequence independent steps of combining third data of a third bit length with the second data of the second bit length into fourth data of a fourth bit length. The fourth bit length substantially includes the combined lengths of the second and third bit lengths.

The method also includes encoding and adjusting the second data into fifth data of a fifth bit length of a substantially similar length as the second bit length, dithering the fifth data into sixth data of a sixth bit length of a substantially similar length as the fourth bit length into seventh data of a seventh bit length of a substantially similar length as the fourth bit length, truncating the seventh data into eighth data of an eighth bit length having a length substantially similar to the second bit length and included the first data embedded therein, and outputting the eighth data with the first data in the data stream.

According to a ninth embodiment of the invention, a data player, which is modified to include an authentication module useful for authenticating data embedded at substantially inaudible levels, is disclosed. The data player includes a data processor reading mixed data, which comprises original data and embedded data, from the media, detecting bits from the media, and detecting the embedded data containing at least one authentication key or component thereof responsive to the step of detecting bits from the media. The data processor further includes comparing the embedded authentication key or component to at least one authentication key or component, authenticating the media and/or embedded data responsive to the comparing, and removing the embedded authentication key or component from the mixed data. The data player outputs the mixed data, comprising substantially the original data and the embedded data, as either audio, video, audio data, video data and/or digital data substantially free of each authentication key or component thereof, in a final output signal.

According to a tenth embodiment of the invention, a data disc is disclosed in a method for authenticating a media and/or data stored on the media in order to prevent piracy and/or unauthorized access and/or unauthorized copying of the data stored on the media. The data disc comprises data that contains at least one authentication key or component in data embedded during substantially inaudible levels and substantially corresponding to the audible levels of the data, for authenticating whether the media and/or the data is authorized. Each authentication key or component is substantially inaudible and is of a first amplitude substantially corresponding to a second amplitude of an audio signal of the data, thereby increasing the audio signal of the data to a higher decibel level.

According to an eleventh embodiment of the invention, a data message is disclosed in a method for authenticating a media and/or a data message to be stored on the media, in order to prevent piracy and/or unauthorized access and/or unauthorized copying of the data stored on the media. The data message contains at least one authentication key or component embedded at substantially inaudible levels and substantially corresponding to the audible levels of the data, for authenticating whether the data message and/or media is authorized. Each authentication key or component is substantially inaudible and is of a first amplitude substantially corresponding to a second amplitude of an audio signal of the data message, thereby increasing the audio signal of the data message to a higher decibel level.

A computer or processor driven system, tangible medium including instructions thereon, and process is also provided.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be used as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially scientists, engineers and practitioners in the art, who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter, which illustrates preferred embodiments of the invention.

BRIEF DESCRIPTION OF THE DRAWINGS

The same reference numerals refer to the same parts throughout the various Figures.

NOTATIONS AND NOMENCLATURES

Figure 1:
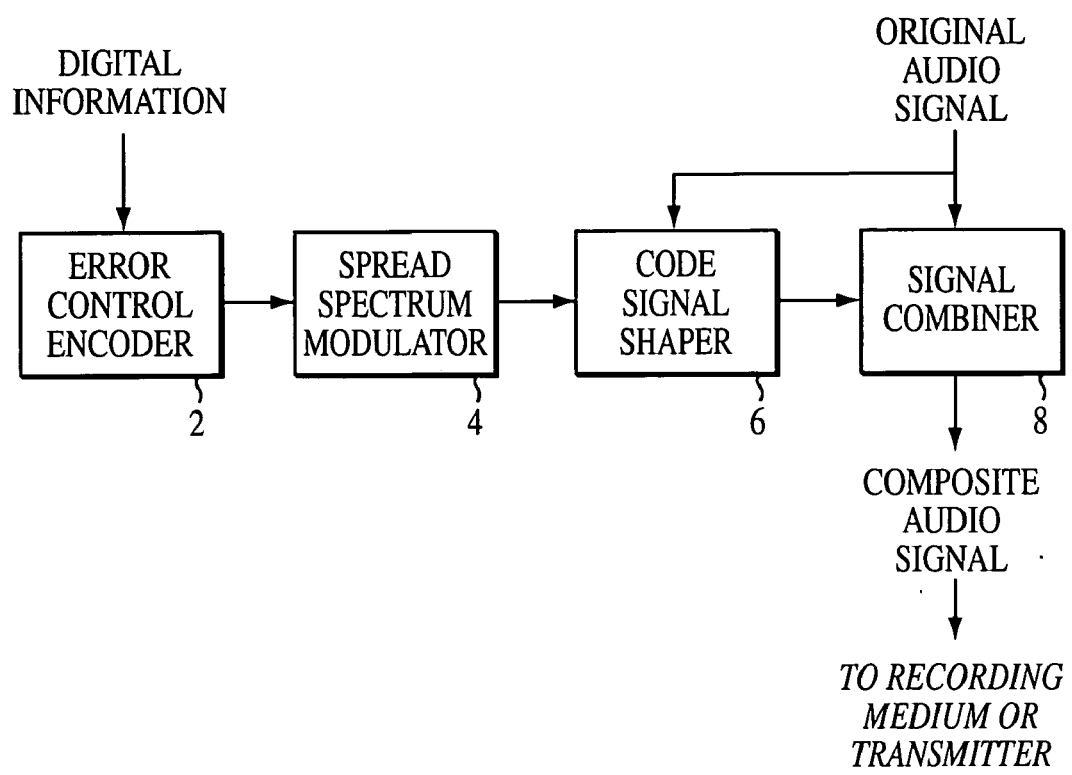
FIG. 1 shows a top level diagram of a conventional apparatus for embedding digital information in an audio signal via a spread spectrum technique.
Figure 2:
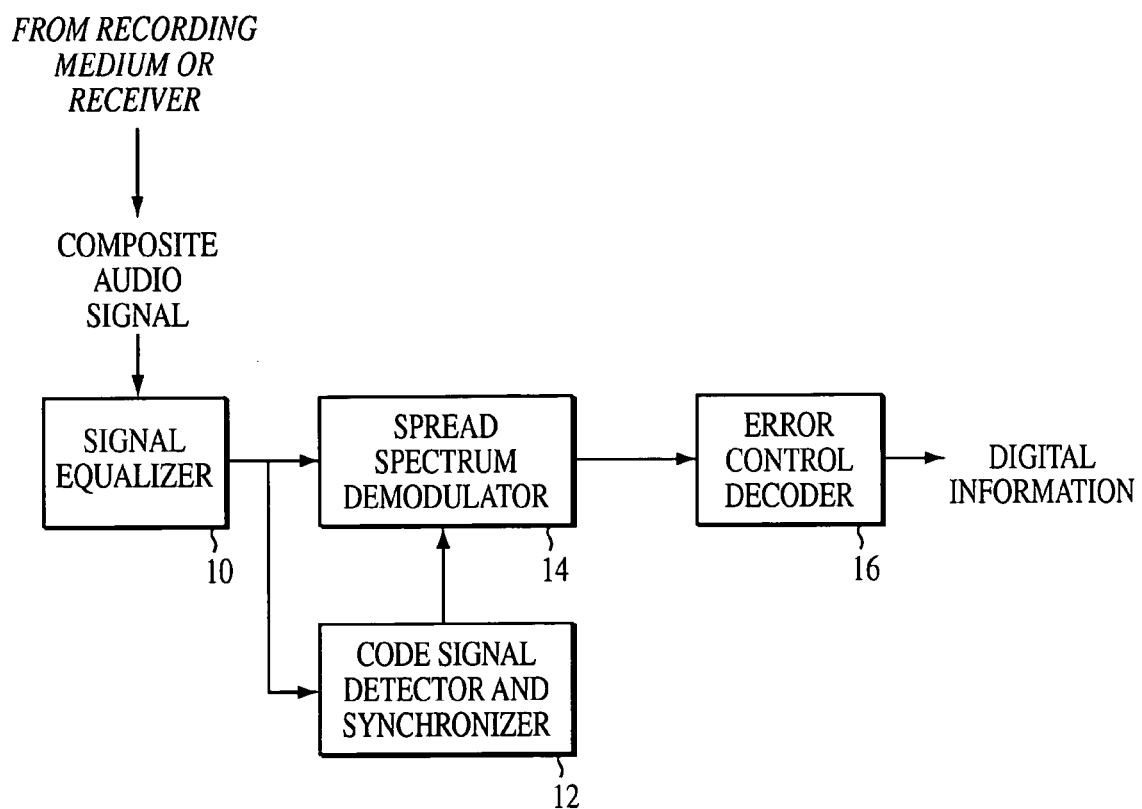
FIG. 2 is a top level block diagram of a conventional apparatus for recovering the digital information from a composite audio signal.
Figure 3:
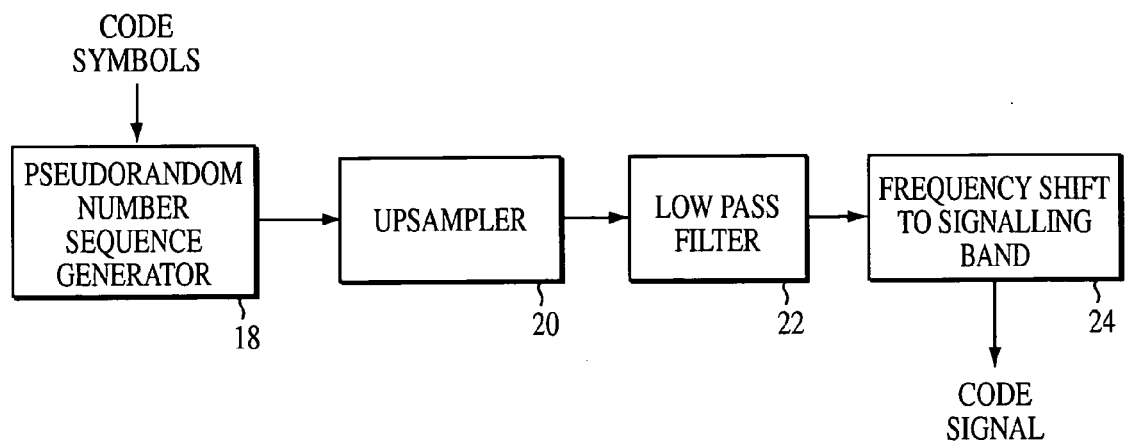
FIG. 3 is a block diagram of a conventional apparatus implementing the spread spectrum modulator function shown in Prior Art FIG. 1.
Figure 4:
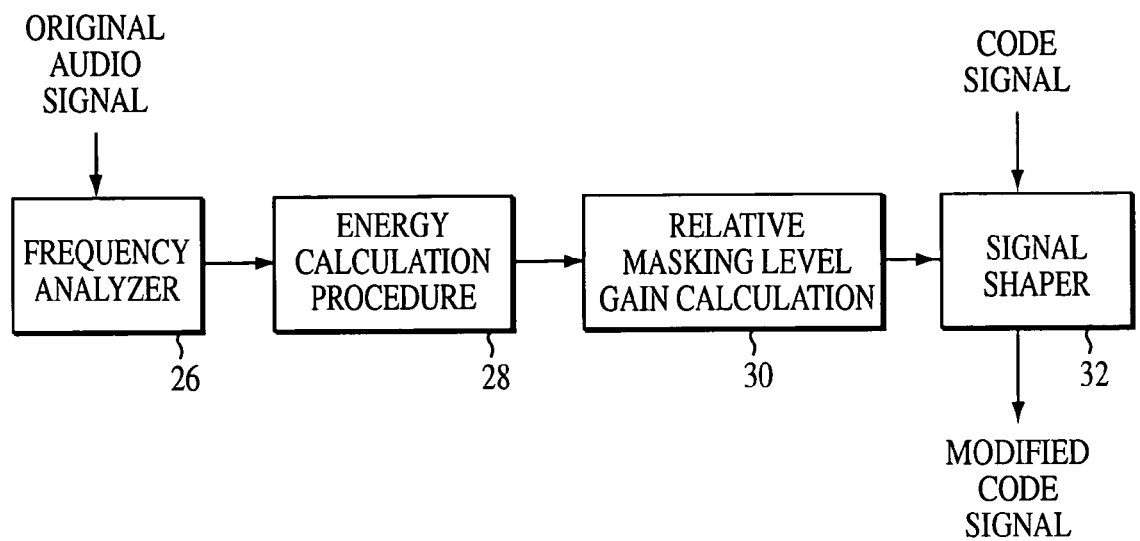
FIG. 4 is a block diagram of a conventional apparatus implementing the code signal shaper function shown in Prior Art FIG. 1.
Figure 5:
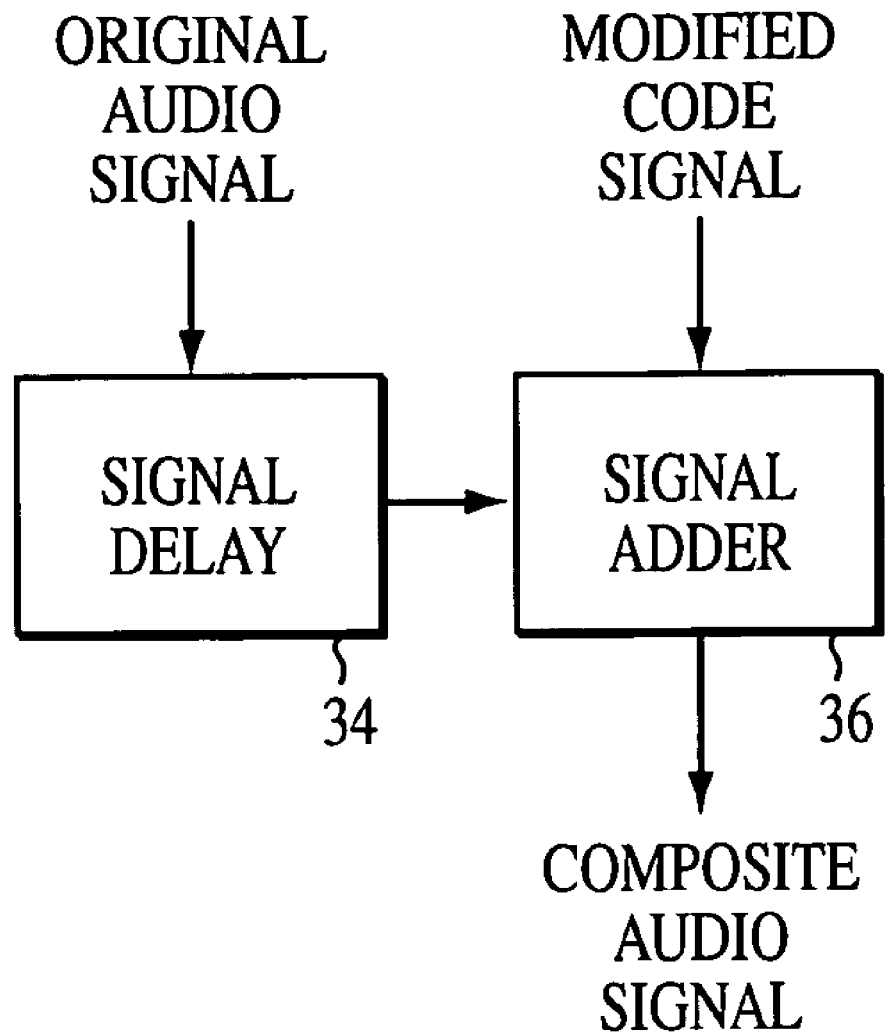
FIG. 5 is a block diagram of a conventional apparatus implementing the signal combiner function shown in Prior Art FIG. 1.
Figure 6:
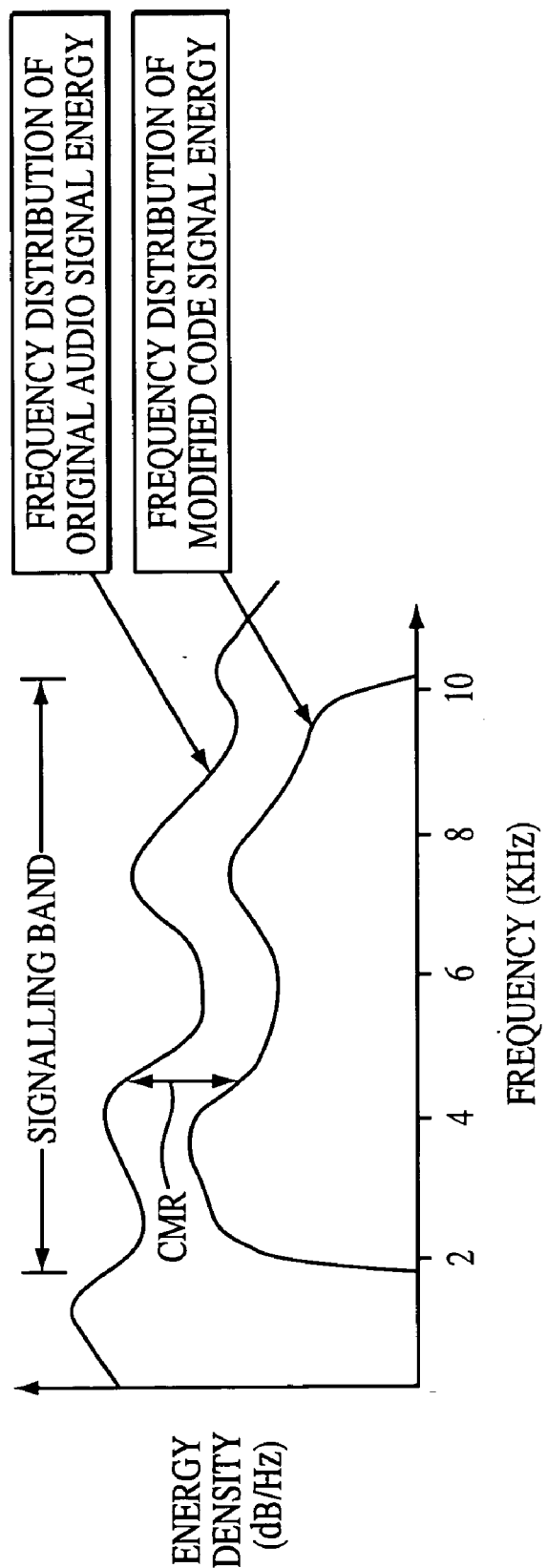
FIG. 6 is a graph illustrating the relationship between the frequency distributions of the original audio signal and the modified code signal generated from the convention apparatus shown in FIG. 1.
Figure 7:
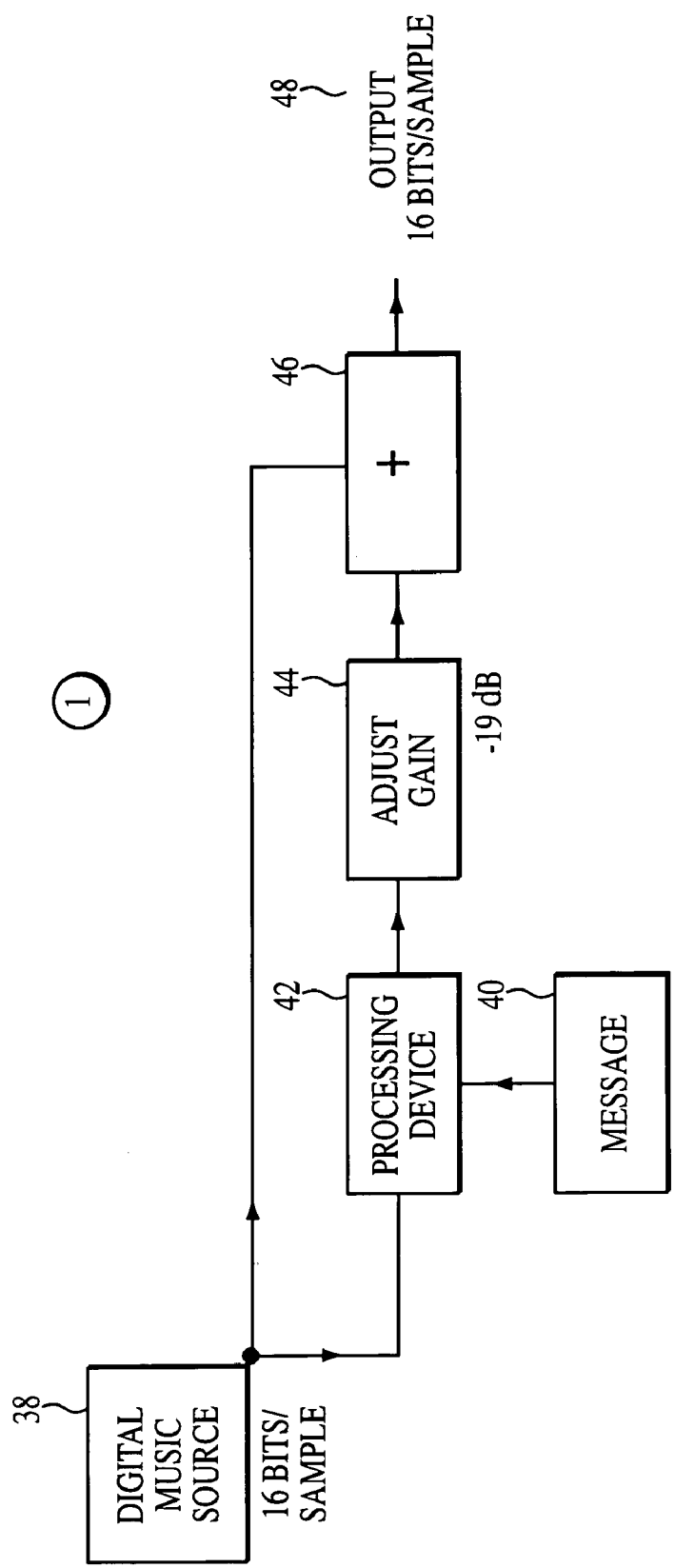
FIG. 7 is a block diagram of a conventional apparatus implementing the error control encoder function shown in Prior Art FIG. 1.

The detailed description that follows may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to an apparatus for performing these operations. This apparatus may be specially constructed for the required purpose or it may comprise a general purpose computer as selectively activated or reconfigured by a computer program stored in a computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

The present invention relates generally to an improved apparatus and method of embedding data into audio signals occurring particularly, for example, at imperceptibly low and/or zero decibel levels. This is accomplished by employing an embedded signaling encoder that has been modified with, for example, a standard dither generator/adder/subtracter apparatus that generates/adds/subtracts dither signals to audio signals at specified bit rates.

One application of the above apparatus and method is directed to the manipulation of proprietary, educational or any kind of data, which are generally composed of 16 bits, that are converted into modulated bit patterns comprising 24 bits. This data can be embedded in a digital music source, which may be an electronic file or optical disc, for any number of desired reasons. The present invention is also applicable to a 24 bit system, or other higher or lower bit system, for which data are embedded in an audio signal that will ultimately become audible to a listener, including video, graphical or other data signal.

By way of example, data can be modulated by the standard sixteen-to-twenty-four modulation system, which is applicable to, for example, DVDs for musical use. The modulated data can then be recorded into the signal surface of a DVD using a standard constant linear velocity (CLV) system.

Figure 8:
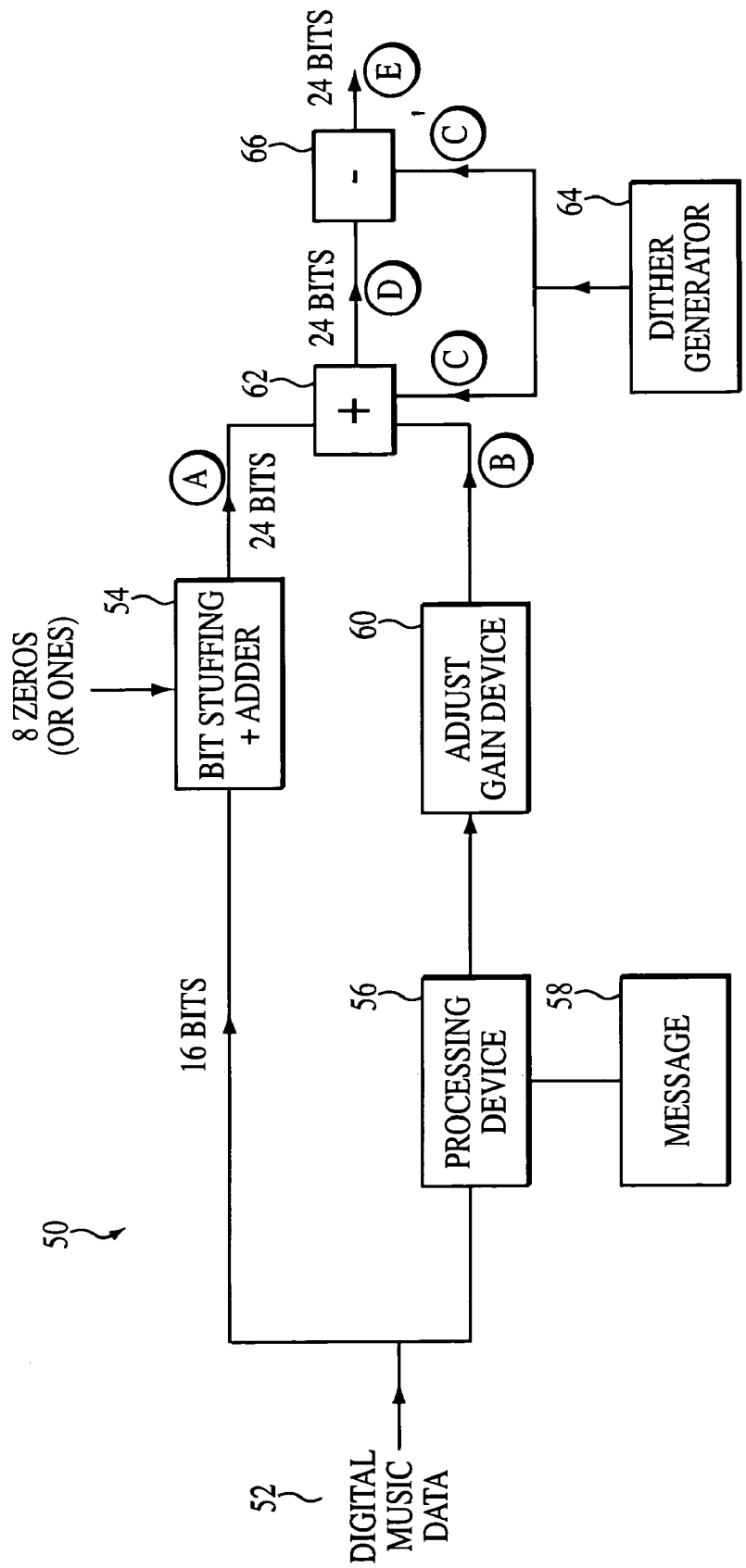
FIG. 8 is a block diagram of an encoder apparatus, equipped with a dither generator, according to the present invention.

More specifically, and referring to FIG. 8, music data 52, each being composed of 16 bits, enters the embedded signaling encoder 50 of the present invention to be ultimately converted into channel bit patterns composed of 24 bits. The data 52 generally comprises the original audio signal (e.g. the digital music) into which the code signal (e.g. a message) 58 is to be embedded. Use of the term "data" 52 in the following description is generic, and generally refers to various forms of data or data storage devices.

Figure 9:
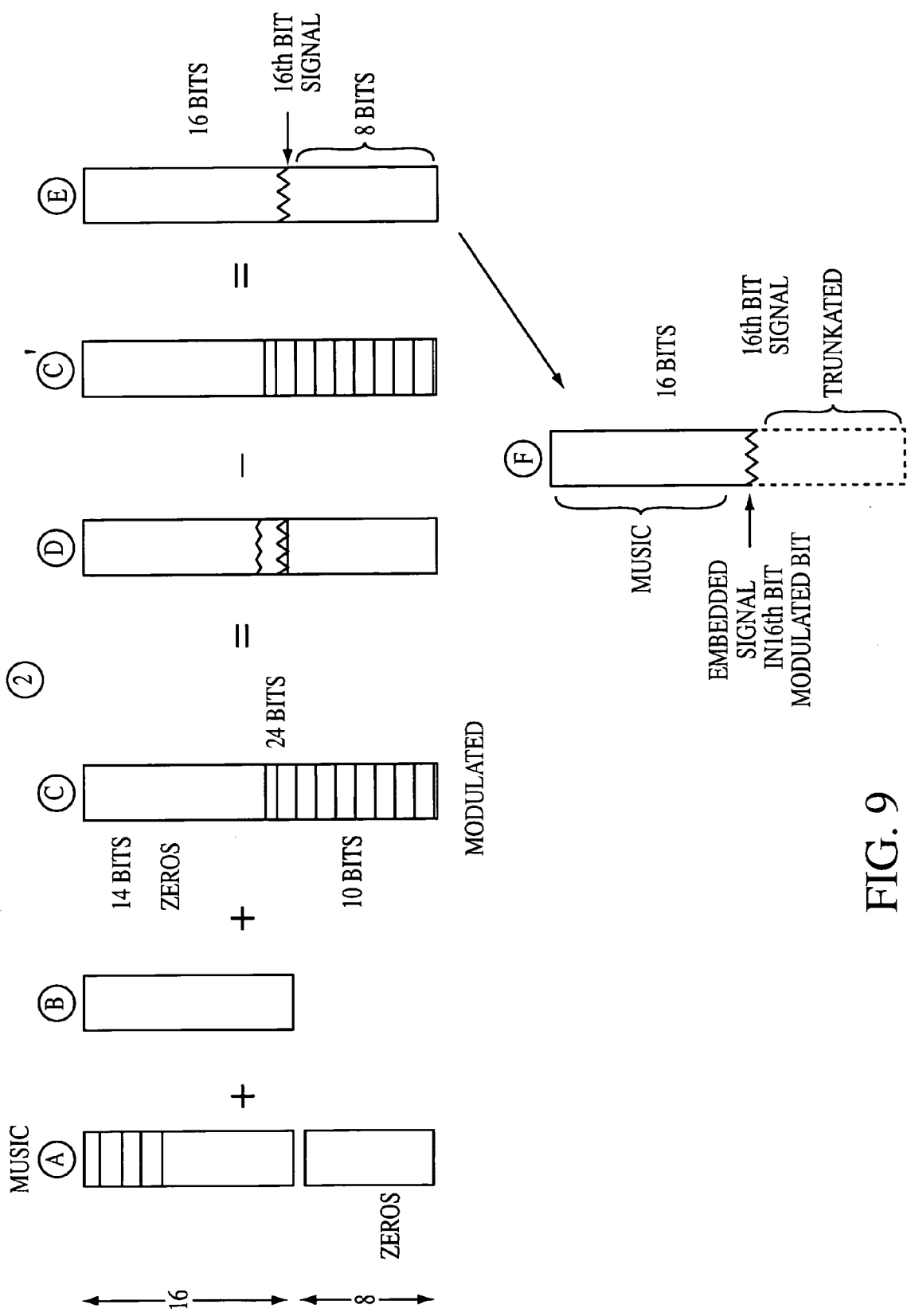
FIG. 9 is block level chart illustrating the various stages of the signals as derived in FIG. 8.

After being introduced into the embedded signaling encoder 50 of the present invention, the data 52 is manipulated by a standard bit stuffing adder 54 ("+") that transforms the data 52 from 16 bits to 24 bits, which is represented by (A). See also FIG. 9. Concurrently with the treatment of the data 52 is the processing, as at block 56, of message 58, which represents the code signal to be embedded. The processing at block 56 includes producing, using conventional processes, a block of n code symbols for each block of k information. Here, for example, the information symbols may comprise the artist's name and the title of the musical selection. Both information and code symbols are drawn from a common alphabet of 256 symbols. In this case, each information symbol represents 8 bits of information.

The code signal output at block 56, which may optionally include standard spread spectrum modulator and standard code signal shaper functions, is further manipulated by a standard adjust gain device 60. Using adjust gain device 60, an added signal can be set to any decibel level in a given system. For instance, in some music, if it is found that the added signal is audible, then the system could be run or implemented at −22 dB, essentially lowering the range by 3 decibels from −19 dB. When this occurs, the through-put signaling bit rate is reduced, because the parameters have been changed. However, while less bits are produced, a positive benefit is achieved in increased audibility.

At processing block 56, the code signal or message 58 is frequency analyzed. At block 60, the frequency distribution of the code signal energy is represented by a set of gain values used to adjust the signal in a standard manner in order to produce a modified code signal (B). The modified code signal (B), comprising the message to be embedded, is generally composed of 16 bits also, and is similarly depicted in FIG. 9.

At block 62, which represents a standard dither adder ("+"), the dynamically-produced modified code signal (B) is combined with the original audio signal (A), and boosted with a 24-bit modulated dither signal (C) produced by a standard dither generator 64. The triple input of data at the dither adder 62 departs from the signal combiner function generally performed in conventional encoders. This is described in more detail below.

Connected to one input of the dither adder 62, dither generator 64 is intended to provide two important signals: first, dither signal (C) to be added to signals (A) and (B), and second, dither signal (C)' (substantially the same magnitude as signal (C)) to be subtracted from the composite signal formed as (D). The dither generator 64 is of 24 bits construction in this embodiment. The substantially random digital dither signal output by dither generator 64, I have determined, may be treated as equivalent to white noise. The dither generator 64 delivers the 24 bits digital dither signal both to the adder 62 and to the subtracter 66.

Other standard forms of dithering technology may be used in combination with the present invention, including such technology represented in U.S. Pat. Nos. 5,712,657, 5,883,536 and 5,889,482, all incorporated herein by reference.

Theoretically, the 24-bit modulated dither signal (C) produced by dither generator 64 serves to add redundancy bits to the signals (A), (B) to be combined. To increase error correction capability, as is the desired goal here, it is necessary to increase the amount of redundancy. Consequently, the extra 24 redundancy bits of dither signal (C) achieves error correction capability by introducing structure and memory into the system.

Effectively, this means that the processing path of the digital music source 52 is boosted to higher decibel levels even in the absence of music when the decibel level is at substantially zero. Dither signal (C) generated by dither generator 64 advantageously provides an additional signal level, depth or dimension in the absence of music. So, the embedding process, instead of disappearing at very low decibel levels, now functions by contributing to the output of a 24-bit composite signal (D).

That is, the output signal resulting from the triple input of data at adder 62 is a composite audio/dither (information/ dither) signal (D) composed of 24 bits containing an embedded message. Composite audio/dither signal (D) has an amplitude that is proportional to the sum of the signals (A)+(B)+(C), and is directed to one input of the dither subtracter 66 ("−").

The other input of the dither subtracter 66 is connected to the dither generator 64 for inputting the dither signal (C)'. Since the first dither signal (C), which has been added to the audio signals (A) and (B), is equivalent in magnitude to 24 bits, the second dither signal (C)' can be of substantially 24 bits. Addition of the dither signal (C) produces a slight increase in the background noise level. The dither subtracter 66 subtracts the substantially 24 bits dither signal (C)' from the composite audio/dither signal (D), and theoretically outputs only an output signal (E) containing the original audio signal and the embedded message only. The present invention may be modified by using other systems and/or methods that effectively boost or increase the data retrieved from the data source to, for example, decibel levels that facilitate embedded signaling therein.

The embodiment so far described is subject to various modifications within the broad teaching hereof. For example, the 24-bit output signal (E) can be advantageously and optionally truncated or reduced to 16 bits, which is represented by signal (F) in FIG. 9. This 16-bit truncated signal (F) still contains the original audio signal as well as the embedded message, which occurs at the sixteenth bit level after dither subtraction. Truncation is optionally accomplished by conventional means.

The quality of the output signal (E) produced after amplitude dithering is such that one would now be able to retrieve embedded messages out of audio that was basically just background noise, since amplitude dithering is based on adding noise to the amplitude of an audio signal.

A profound implication and advantage of the present invention is the new capability of being able to bury messages during periods of silence on a CD or DVD, such as during the silence that occurs between adjacent music tracks or at the beginning of the CD, and successfully recover those messages. Thus, using the above described system and method of the present invention, one would be able to otherwise embed and retrieve messages at the moment of silence or at a very low decibel level of music. Obviously, this does not exclude the notion that embedding, or subsequent decoding, can also occur during periods of audible music playback, in accordance with the present invention.

It is important to recognize that the improved embedded signaling encoder 50 of the present invention, can optionally be used for authentication purposes in order to track and/or prevent either piracy, unauthorized access and unauthorized copying of data on a data medium. More specifically, because the modified encoder/dithering apparatus and method facilitates the burying of messages optionally through periods of silence on a CD, for instance, the customarily difficult issue of determining which song to embed a desired message is eliminated.

Using the modified encoder/dithering system of the present invention, a message containing one or more authentication keys can be embedded within a song or anywhere at a moment of silence on the CD. This means that if a music track begins with complete silence or at a very low audible level, access to authentication keys that are embedded during silence or at low levels, is not impaired, and unauthorized access to the data can be prevented.

Figure 10:
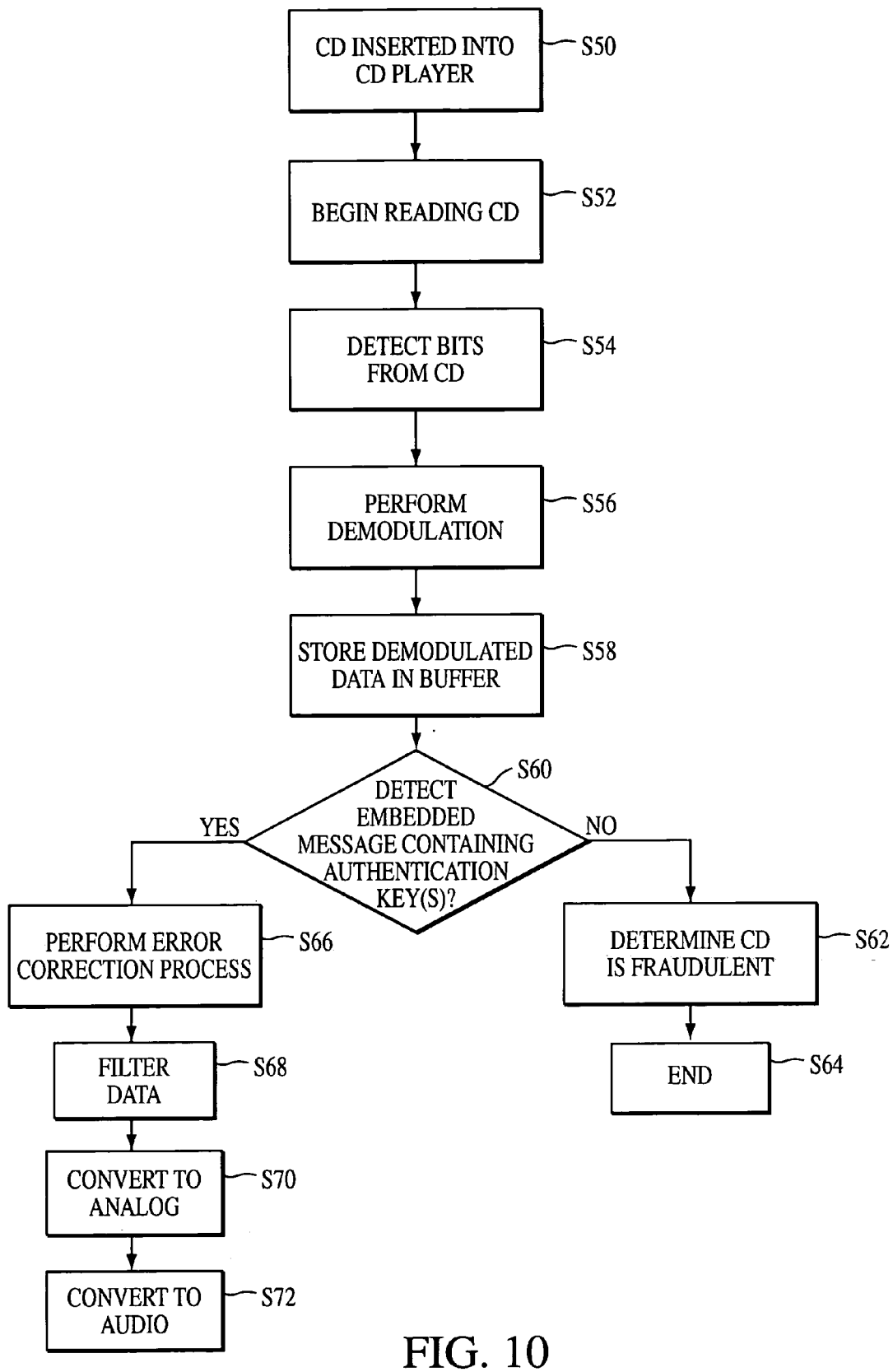
FIG. 10 shows a flow chart of the decision logic describing the authentication process of a CD, which contains an message embedded during silence or low decibel levels in accordance with the system and method of the present invention, to be played on a CD player.

In this regard, FIG. 10 is illustrative as one embodiment of an authentication application of the present invention. FIG. 10 shows a flow chart of the decision logic describing an exemplary authentication process of a CD, containing a message that was embedded according to the present invention, to be played on a CD player.

For simplicity, the following steps are identified in the drawings by the letter "S" preceding the reference numeral; that is, Step 50 is shown in the drawing as "S50", etc.

In FIG. 10, the process begins (Step 50) when a CD is inserted into a CD player. The player begins reading the CD, (Step 52), by detecting bits from the disc's surface (Step 54). Once the data is recovered, the data is modulated using, for example, standard eight-to-fourteen modulation (Step 56). The demodulated data is sent to a standard buffer (Step 58).

At Step 60, (Step 60), the player's circuitry or processes must determine whether the CD contains an embedded message containing one or more authentication keys. This message is embedded, for example, advantageously and optionally at imperceptibly low decibel levels, in accordance with the present invention. If no embedded message containing the appropriate authentication key(s) exists, or has been successfully recovered by the destination CD player/recorder, the disc is determined to be fraudulent (Step 62), and the disc player ends playback activity (Step 64).

On the other hand, if it is found that the disc contains the appropriate embedded message, the player's circuitry is triggered to begin the error removal process (Step 66) in which errors are removed, data is filtered (Step 68) and ultimately converted to sensible audible output data (Steps 70, 72). While the above description focuses on a particular sequence of process steps, the present invention may alternatively be used via a different sequence of the above described steps.

Figure 11:
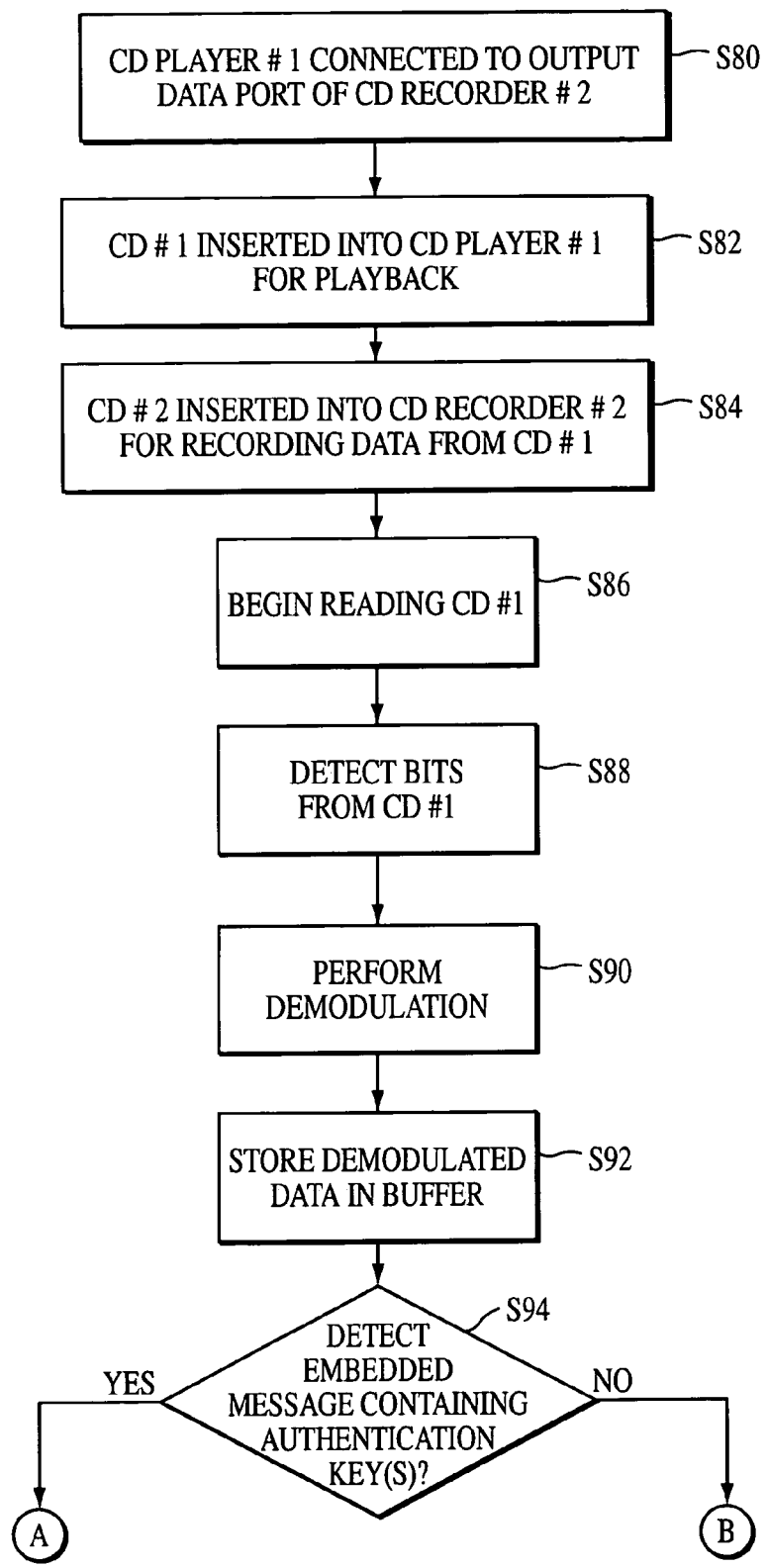
FIGS. 11–13 illustrate a flow chart of the decision logic describing operations when a first CD, which contains a message embedded according to the present invention, plays data to be recorded by a second CD, which does not contain the message embedded in accordance with the present invention.

FIG. 11 illustrates a flow chart of the decision logic describing exemplary operations when a first CD, containing a message embedded according to the present invention, plays the data to be recorded by a second CD, which does not contain a message embedded in accordance with the present invention.

For simplicity, the CD player will be referenced as player #1, and the CD recorder will be referenced as recorder #2. Also, the first CD played by player #1 will be referenced as CD #1, and the second CD recorded by recorder #2 will be referenced as CD #2.

At inception (Step 80), CD player #1 is connected to the output data port of recorder #2, or other standard means for capturing the output of player #1. Playback begins when CD #1 is inserted into player #1 (Step 82). Recording begins when CD #2 is inserted into recorder #2 (Step 84). The next step in CD player #1 is the reading of CD #1 (Step 86), by detecting bits contained on the surface of CD #1 (Step 88).

Once the data is recovered, the data is demodulated using, for example, standard eight-to-fourteen modulation or other standard modulation (Step 90). The demodulated data is transferred and stored in a standard buffer (Step 92).

Figure 12:
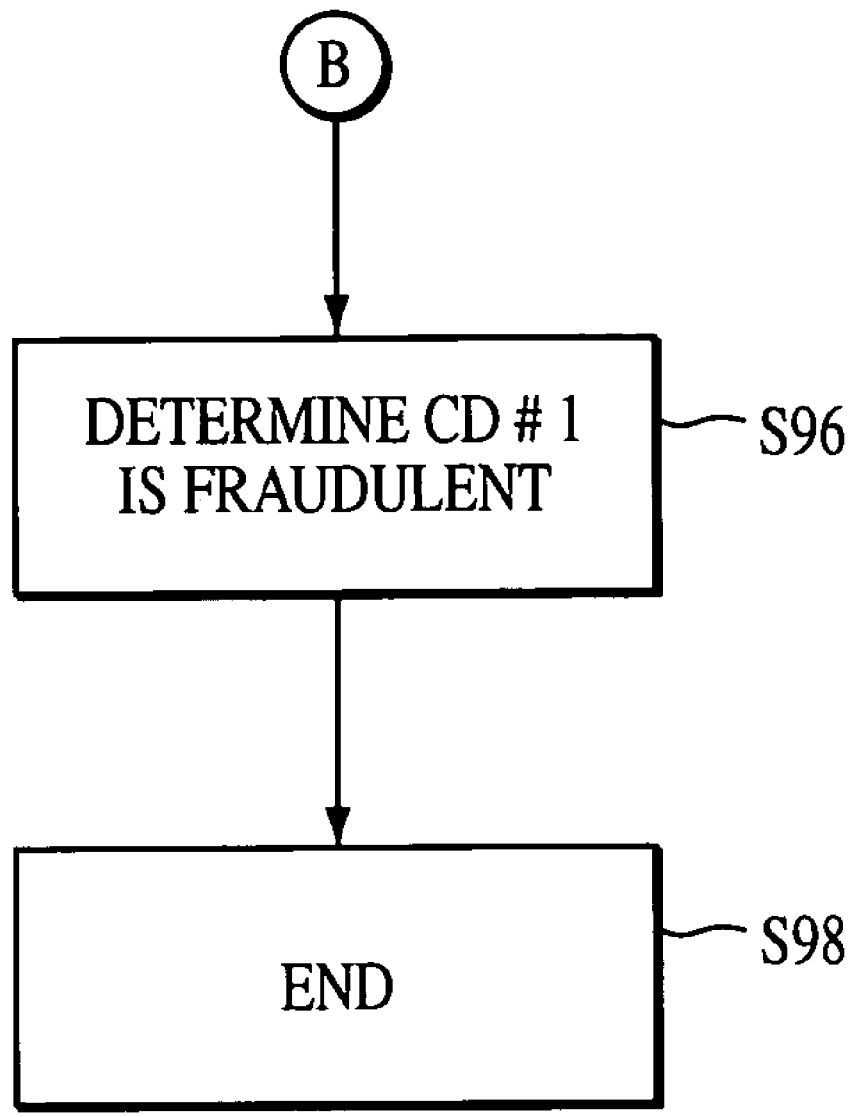

At Step 94 (Step 94) depicted in FIG. 11, it is determined whether the disc contains a message, having one or more authentication key(s), that was embedded, for example, advantageously and optionally at imperceptibly low decibel levels, in accordance with the present invention. If no embedded message containing the appropriate authentication key(s) exist or has been successfully recovered by the destination CD player/recorder, the disc is determined to be fraudulent (Step 96), and the disc player ends playback activity (Step 98), as earlier stated. See FIG. 12.

On the other hand, if it is found that the disc contains the appropriate embedded message, the player's circuitry is triggered to begin the error removal process (Step 100) in which errors are removed, data is filtered (Step 102) and ultimately converted to sensible audible output data (Steps 104). See FIG. 13.

Figure 13:
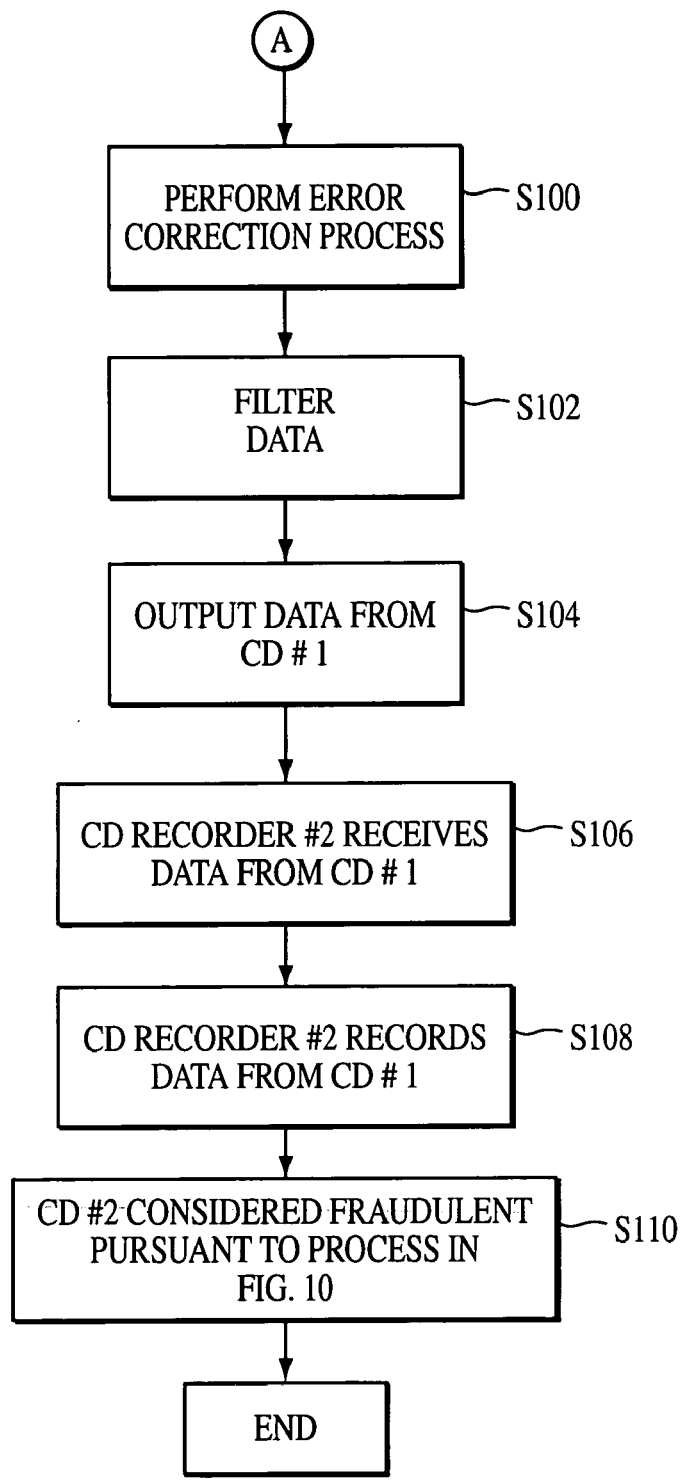

Referring to FIG. 13, at this juncture, the authentication process for playing the CD is completed, and recorder #2 receives the audio data from CD #1 (Step 106). Upon receipt, CD recorder #2 records the data onto CD #2, which is a copy (Step 108). If CD #2 is later inserted into a CD player, it will be determined to be a fraudulent CD pursuant to the above-mentioned process of FIG. 10, because CD #2 does not contain the requisite embedded message (Step 110).

Figure 14:
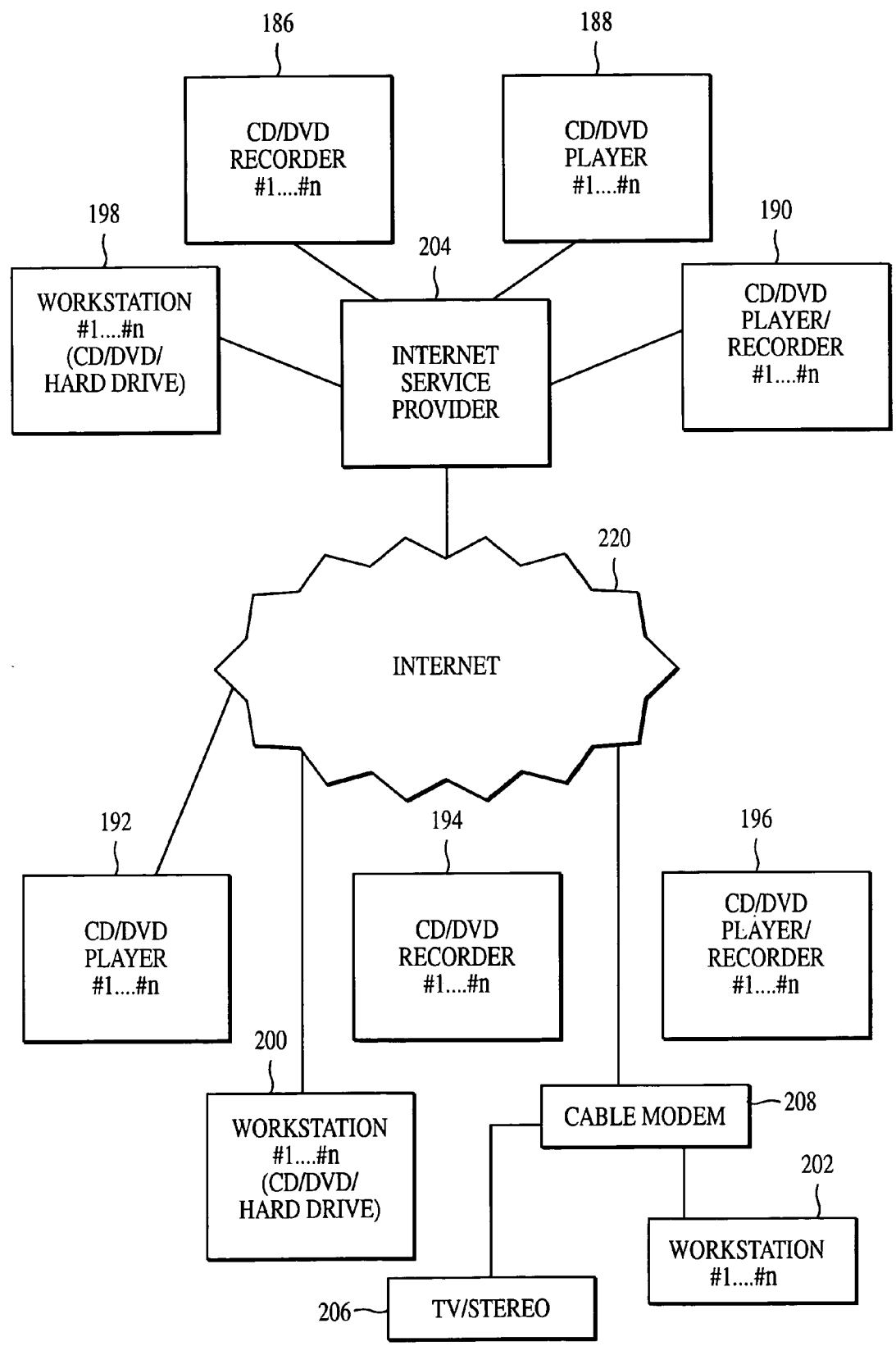
FIG. 14 shows a plurality of disc players, disc recorders and work stations connected to a global network, such as the Internet, via an Internet Service Provider, in accordance with one embodiment.

FIG. 14 shows a plurality of disc players and disc recorders 186, 188, 190, 192, 194, 196 and work stations 198, 200, 202 connected to a global network, such as the Internet 220, via an Internet Service Provider 204, in accordance with one embodiment. The above system also accommodates Internet access to electronic audio/video data files through home electronic equipment, such as television/stereos 206 and cable/modems 208. Thus, data may emanate from, or be transmitted to, any one of these stations or devices.

Figure 15:
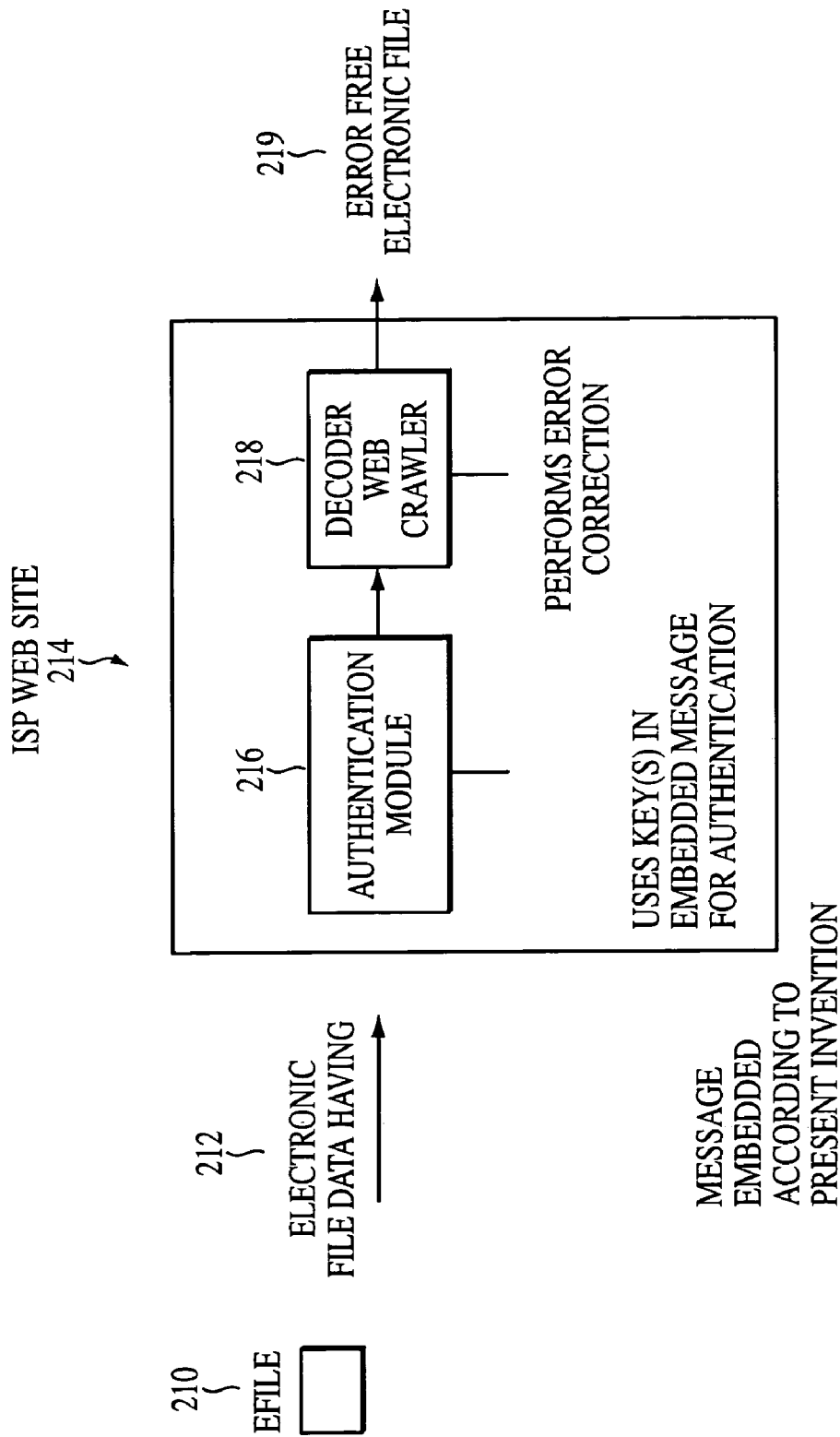
FIG. 15 shows a block diagram of the architecture through which one or more embedded messages of the present invention are stored in an electronic file, and are used for authenticating the existence of a non-pirated efile.
Figure 16:
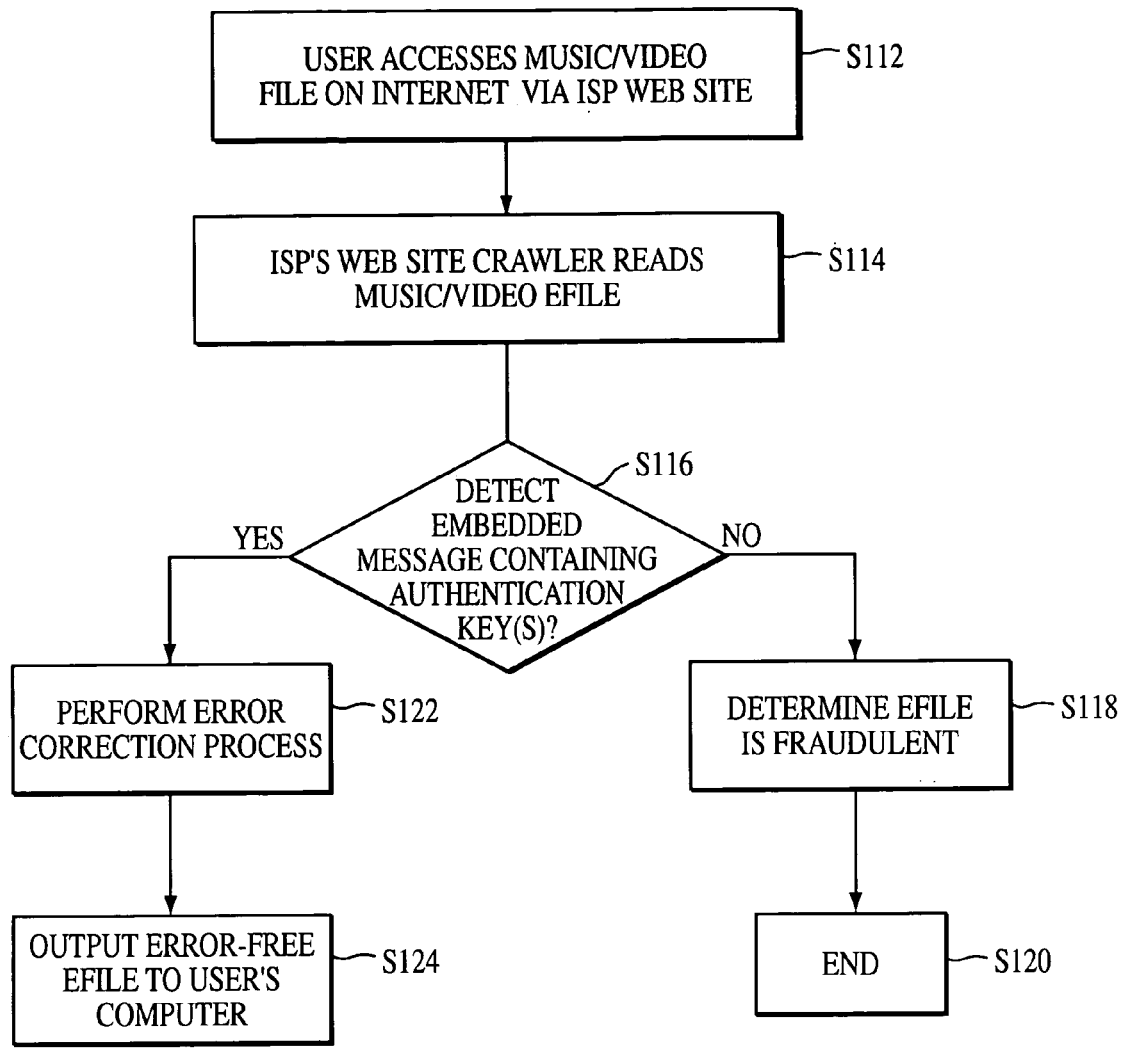
FIG. 16 illustrates a flow chart of the decision logic describing the authentication process of an electronic audio/video data file, containing a message embedded according to the present invention, retrieved via the Internet for playing.

FIGS. 15–16 shows an exemplary authentication process as it applies to Internet-related playing and copying. For instance, FIG. 15 shows a block diagram of the architecture through which one or more messages, embedded according to the present invention, are stored in an electronic file, and are used for authenticating the existence of a non-pirated efile. The architecture begins with a data media, which may be a CD, DVD, a computer or network of computers, such as the Internet, capable of storing data.

In this embodiment, the data media is an electronic video or audio data file ("efile") 210 into which a message, containing one or more authentication key(s), is embedded therein.

The resulting data ("efile data") 212 containing the embedded message is transmitted to an authentication module 216 when efile 210 is requested by a user over the Internet. Authentication module 216 is disposed, for example, at the ISP's web site 214, which uses the authentication key(s) contained in the embedded message in efile data 212 for authenticating whether efile 210 is a non-pirated file. Once efile 210 is authenticated, authentication module 216 transfers data 212 to a decoder web crawler 218, which intakes the data, manipulates it, performs error correction and outputs error-free corrected data efile 219, which is substantially free of each authentication key or component thereof.

The above description is one example of the architecture used to implement the present invention. Other architectures may also be used. For example, the ISP website and/or server need not physically house or contain the authentication or decoder modules, but one or both of these devices may be disposed remote to the ISP website and/or server.

FIG. 16 illustrates a flow chart of the decision logic describing an exemplary authentication process of an electronic audio/video data file, containing a message embedded at substantially inaudible levels, that is retrieved via the Internet for playing.

The process begins (Step 112) when a user accesses music and/or video file(s) on the Internet via an ISP's web site 214. The ISP's decoder web crawler 218 begins reading the efile 210 (Step 114), looking for message(s), which contain one or more authentication key(s), that are embedded, for example, advantageously and optionally at imperceptibly low decibel levels in accordance with the present invention (Step 116). If no embedded message containing the appropriate authentication key(s) exists or has been successfully recovered by the destination data processor, efile 210 is determined to be fraudulent (Step 118), and efile 210 is not transmitted to the user; the process ends (Step 120). Thus, unauthorized efile access is prevented.

On the other hand, if it is found that efile 210 contains the appropriate embedded message, error correction occurs (Step 122), the data is filtered, converted to sensible audio and/or video output data, and ultimately transmitted to the user at his/her computer or data processor (Step 124).

Figure 17:
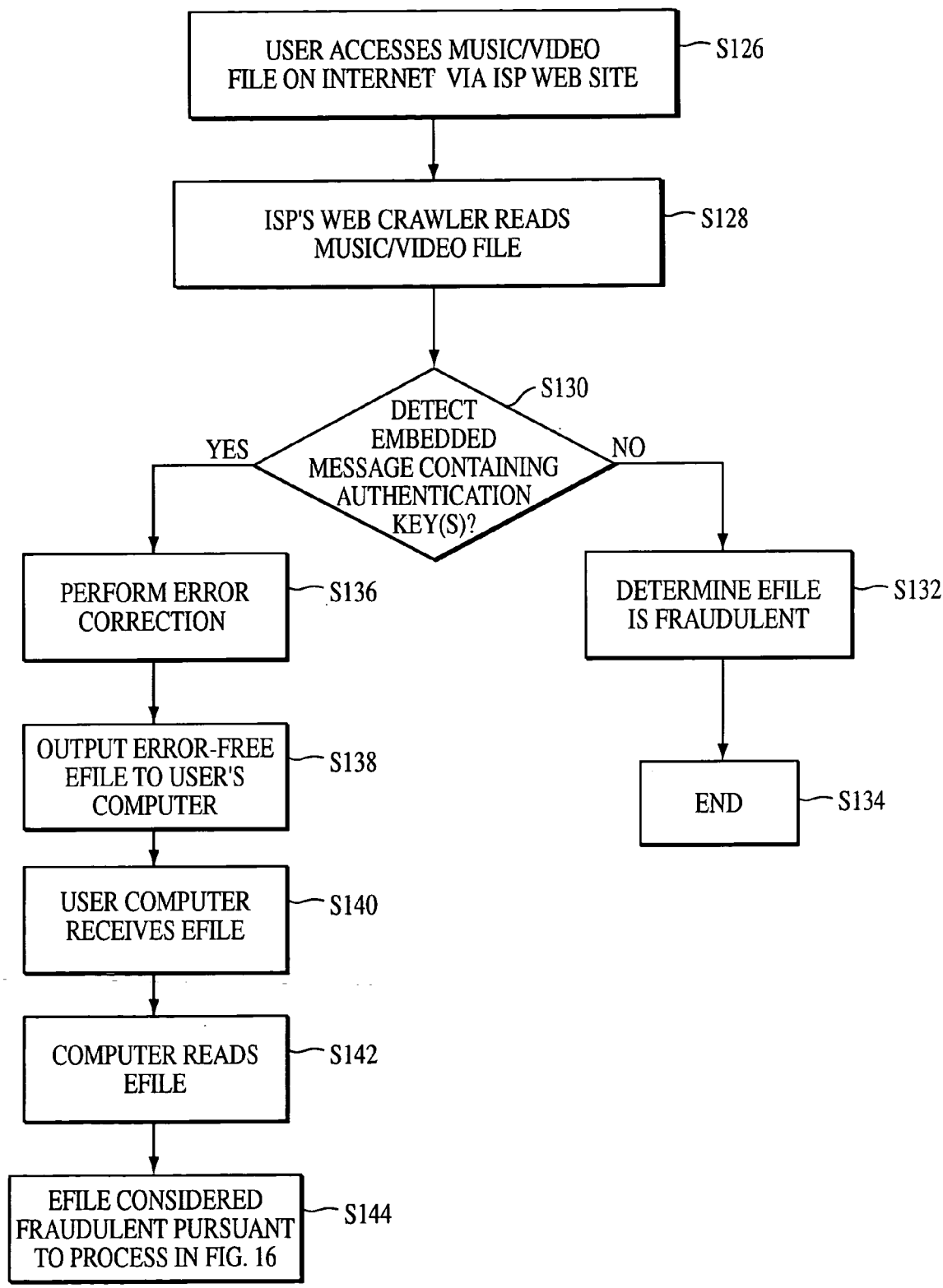
FIG. 17 illustrates a flow chart of the decision logic describing the authentication process of an electronic audio/video data file, containing a message embedded according to the present invention, retrieved via the Internet for copying.

FIG. 17 illustrates a flow chart of the decision logic describing an exemplary authentication process of an electronic audio/video data file, containing a message embedded according to the present invention, retrieved via the Internet for copying.

The process begins (Step 126) when a user accesses music and/or video file(s) on the Internet via an ISP's web site 214. The ISP's decoder web crawler 218 begins reading the efile 210 (Step 128) looking for a message, which contains one or more authentication key(s), that is embedded, for example, advantageously and optionally at substantially low decibel levels (Step 130).

If no embedded message containing the appropriate authentication key(s) exist or has been successfully recovered by the destination data processor, efile 210 is determined to be fraudulent (Step 132), and efile 210 is not transmitted to the user; the process ends (Step 134). Thus, unauthorized efile access is prevented.

On the other hand, if it is found that efile 210 contains the appropriate embedded message, error correction occurs (Step 136), the data is filtered, converted to, for example, audio and/or video output data, and ultimately transmitted to the user (Step 138). The user's computer receives efile 210 (Step 140) at which point a user may record the efile 120 (Step 142). This efile 210 is considered fraudulent for purposes of future Internet use (S144), pursuant to the process outlined in FIG. 16, because it does not contain the appropriate embedded message containing the authentication key(s) for subsequent authentication.

Figure 18:
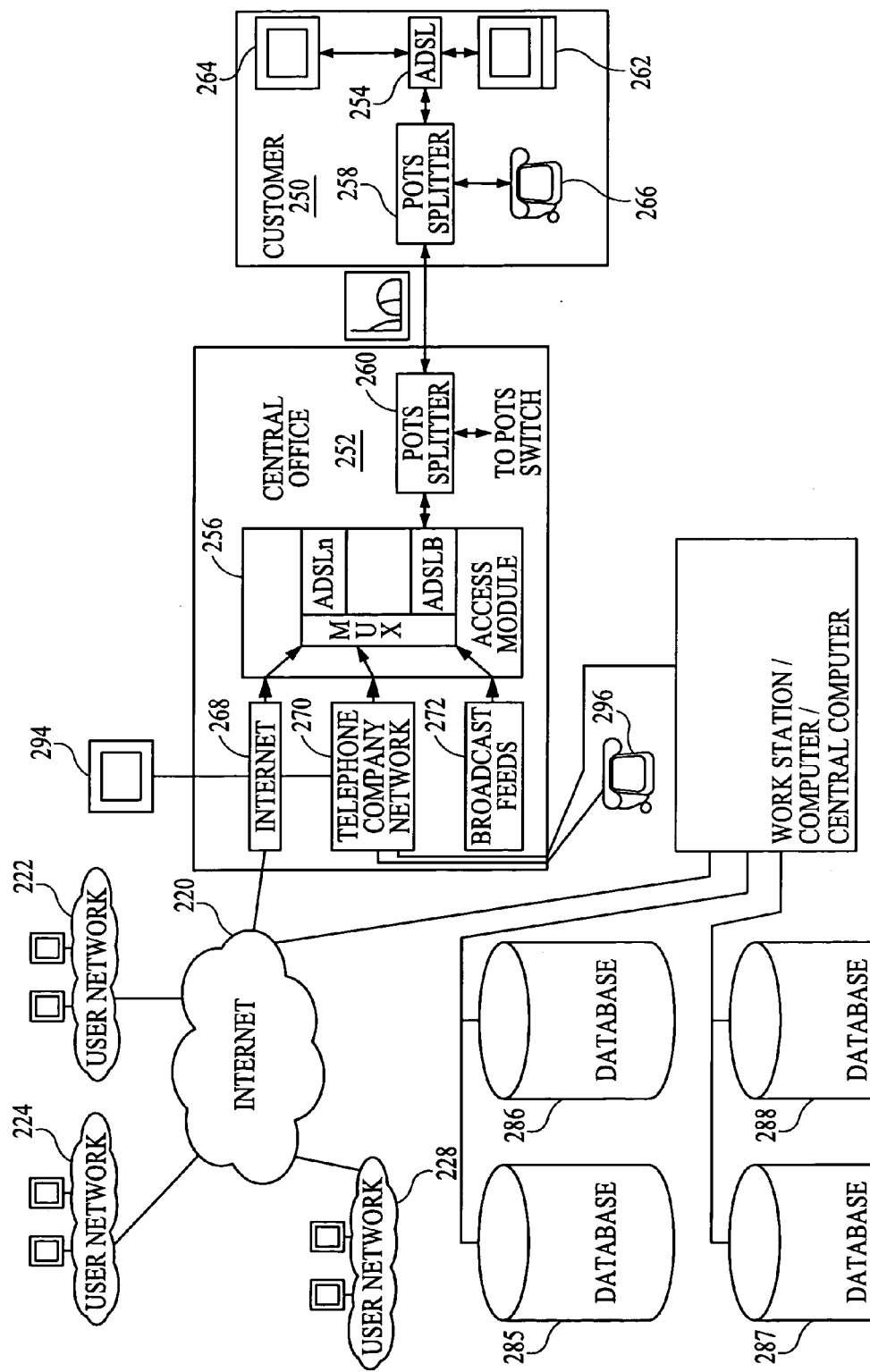
FIG. 18 is an illustration of the architecture of the combined Internet, POTS, and ADSL architecture for use with a data source or data media containing a message embedded in accordance with the present invention, in accordance with another embodiment.

FIG. 18 is an illustration of the architecture of the combined Internet, POTS, and ADSL architecture for use in the present invention in accordance with another embodiment. In FIG. 18, to preserve POTS and to prevent a fault in the ADSL equipment 254, 256 from compromising analog voice traffic 226, 296 the voice part of the spectrum (the lowest 4 kHz) is optionally separated from the rest by a passive filter, called a POTS splitter 258, 260. The rest of the available bandwidth (from about 10 kHz to 1 MHZ) carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADLS makes use of advanced modulation techniques, of which the best known is the discrete multitone technology (DST). As its name implies, ADSL transmits data asymmetrically— at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHZ television channels that occupy spectrum above 50 MHZ (and more likely 550 MHz) and carve an upstream channel out of the 5–50 MHZ band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The Internet architecture 220 and ADSL architecture 254, 256 may also be combined with, for example, user networks 222, 224, 228. As illustrated in this embodiment, users may access or use or participate in the administration, or management computer assisted program in computer 240 via various different access methods. In this embodiment, the various databases 285, 286, 287 and/or 288, which may be used to store content, data and the like, are accessible via access to and/or by computer system 240, and/or via Internet/local area network 220.

The above embodiments are only to be construed as examples of the various different types of computer systems that may be utilized in connection with the computer-assisted and/or -implement process of the present invention.

Further, while the above description has focused on one or more authentication key(s) contained in a message, which is embedded in accordance with the present invention, that is manufactured into a specific media, such as a CD, the embedded message of the present invention may also be applicable to a digital bit stream that is in the process of being transmitted from an originating area or device to a destination device. In this situation, the digital bit stream would be marked with a specific code responsive to the message, embedded in accordance with the present invention, on the data disc that were detected via one or more of the above processes. Alternatively, or in addition, the derived embedded message may be required to be uncoded, or may be used as an authentication in an encryption algorithm to derive the specific data associated with the tracking of the data disc and/or to determine whether the CD is, in fact, authentic.

Moreover, the exemplary authentication process disclosed herein may be used with the message, embedded according to the present invention, to authenticate a data stream or collection of data, as opposed to, or in addition to, authenticating a specific media that has been used to play the data.

Figure 19:
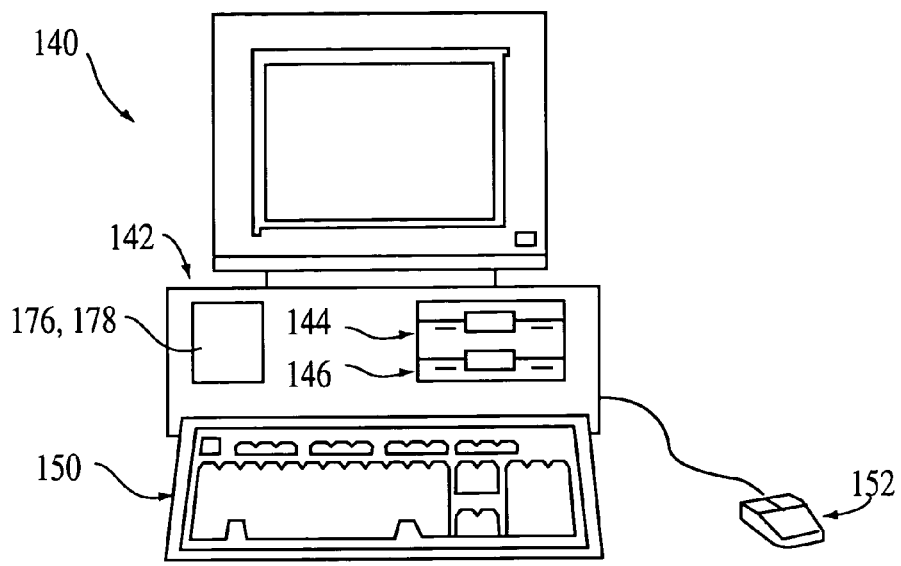
FIG. 19 is an illustration of a main central processing unit for implementing the computer processing in accordance with a computer implemented embodiment by which the present invention can be used.

FIG. 19 is an illustration of a main central processing unit for implementing the computer processing in accordance with a computer implemented embodiment by which the present invention can be used. The procedures described above may be presented in terms of program procedures executed on, for example, a computer or network of computers.

Viewed externally in FIG. 19, a computer system designated by reference numeral 140 has a central processing unit 142 having disc drives 144 and 146. Disc drive indications 144, 146 are merely symbolic of a number of disc drives that might be accommodated by the computer system. Typically these would include a floppy disc drive such as 144, a hard disc drive (not shown externally) and a CD ROM indicated by slot 146. The number and type of drives varies, typically with different computer configurations. Disc drives 144, 146 are in fact optional, and for space considerations, may be easily omitted from the computer system used in conjunction with the production process/apparatus described herein.

The computer also has an optional display 148 upon which information is displayed. In some situations, a keyboard 150 and a mouse 152 may be provided as input devices to interface with the central processing unit 142. Then again, for enhanced portability, the keyboard 150 may be either a limited function keyboard or omitted in its entirety. In addition, mouse 152 may be a touch pad control device, or a track ball device, or even omitted in its entirety as well. In addition, the computer system also optionally includes at least one infrared transmitter 176 and/or infrared receiver 178 for either transmitting and/or receiving infrared signals, as described below.

Figure 20:
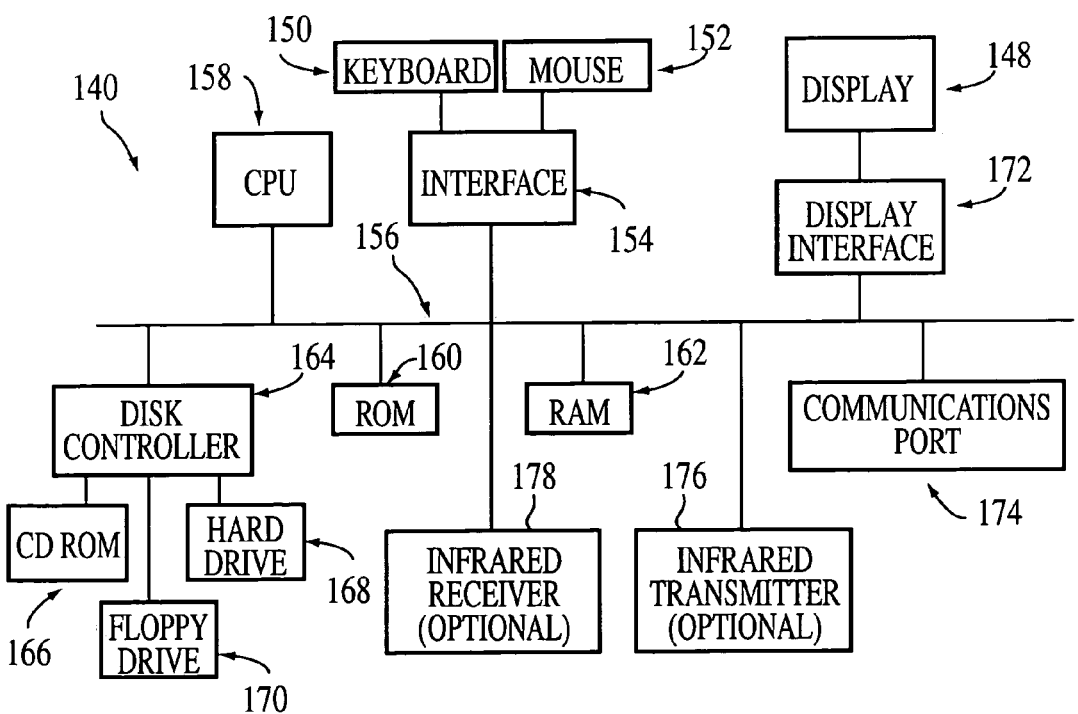
FIG. 20 illustrates a block diagram of the internal hardware of the computer of FIG. 19.

FIG. 20 illustrates a block diagram of the internal hardware of the computer of FIG. 19. A bus 156 serves as the main information highway inter-connecting the other components of the computer. CPU 158 is the central processing unit of the system, performing calculations and logic operations required to execute a program. Read only memory (ROM) 160 and random access memory (RAM) 162 constitute the main memory of the computer. Disc controller 164 interfaces one or more disc drives to the system bus 156. These disc drives may be floppy disc drives such as 170, or CD ROM or DVD (digital video disc) drives such as 166, or internal or external hard drives 168. As indicated previously, these various disc drives and disc controllers are optional devices.

A display interface 172 interfaces display 148 and permits information from the bus 156 to be displayed on the display 148. Again as indicated, display 148 is also an optional accessory. For example, display 148 could be substituted or omitted. Communication with external devices, for example, the components of the apparatus described herein, occurs using communications port 174. For example, optical fibers and/or electrical cables and/or conductors and/or optical communication (e.g., infrared and the like) and/or wireless communication (e.g., radio frequency (RF) and the like) can be used as the transport medium between the external devices and communication port 174.

In addition to the standard components of the computer the computer also optionally includes at least one of infrared transmitter 176 or infrared receiver 178. Infrared transmitter 176 is used when the computer system is used in conjunction with one or more of the processing components/stations that transmits/receives data via infrared signal transmission.

Figure 21:
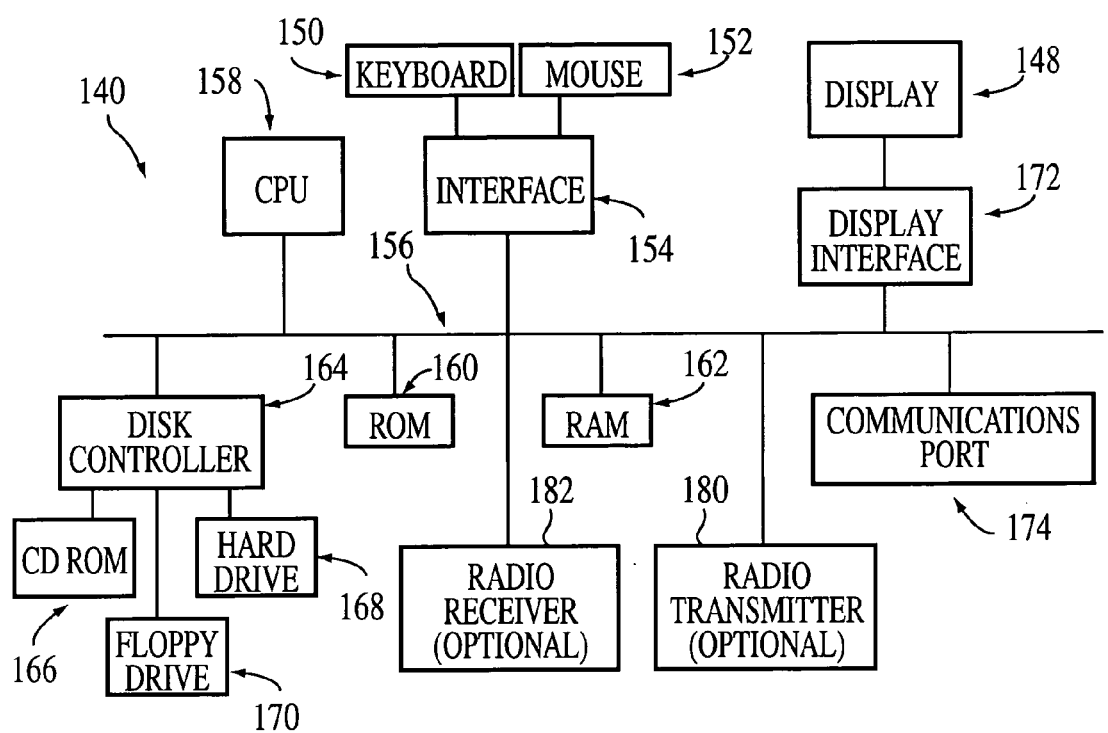
FIG. 21 is a block diagram of the internal hardware of the computer of FIG. 19 in accordance with a second embodiment.

FIG. 21 is a block diagram of the internal hardware of the computer of FIG. 19 in accordance with a second embodiment. In FIG. 21, instead of utilizing an infrared transmitter or infrared receiver, the computer system uses at least one of a low power radio transmitter 180 and/or a low power radio receiver 182. The low power radio transmitter 180 transmits the signal for reception by components of the production process, and receives signals from the components via the low power radio receiver 182. The lower power radio transmitter and/or receiver 180, 182 are standard devices in industry.

Figure 22:
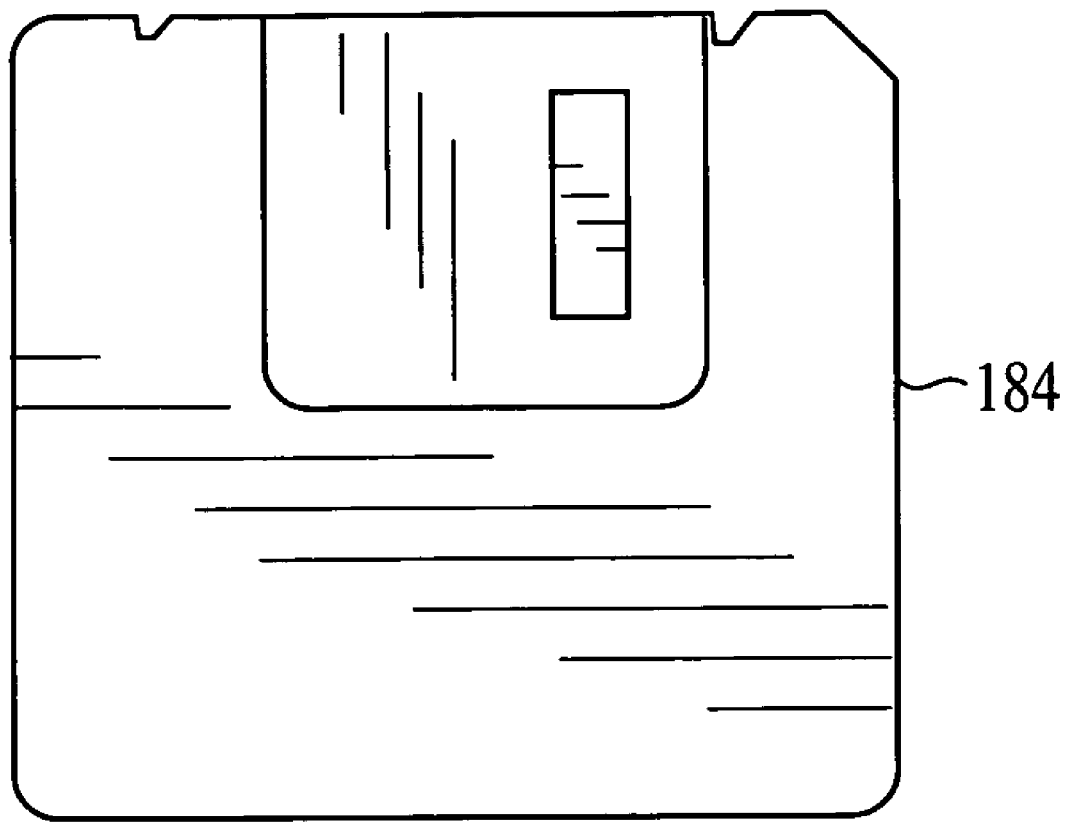
FIG. 22 is an illustration of an exemplary memory medium which can be used with disc drives illustrated in FIGS. 19–21.

FIG. 22 is an illustration of an exemplary memory medium which can be used with disc drives illustrated in FIGS. 19–21. Typically, memory media such as floppy discs, or a CD ROM, or a digital video disc will contain, for example, a multi-byte locale for a single byte language and the program information for controlling the computer to enable the computer to perform the functions described herein. Alternatively, ROM 160 and/or RAM 162 illustrated in FIGS. 21–22 can also be used to store the program information that is used to instruct the central processing unit 158 to perform the operations associated with the production process.

Although processing system 140 is illustrated having a single processor, a single hard disc drive and a single local memory, processing system 140 may suitably be equipped with any multitude or combination of processors or storage devices. Processing system 140 may, in point of fact, be replaced by, or combined with, any suitable processing system operative in accordance with the principles of the present invention, including sophisticated calculators (and hand-held), laptop/notebook, mini, mainframe and super computers, as well as processing system network combinations of the same.

Figure 23:
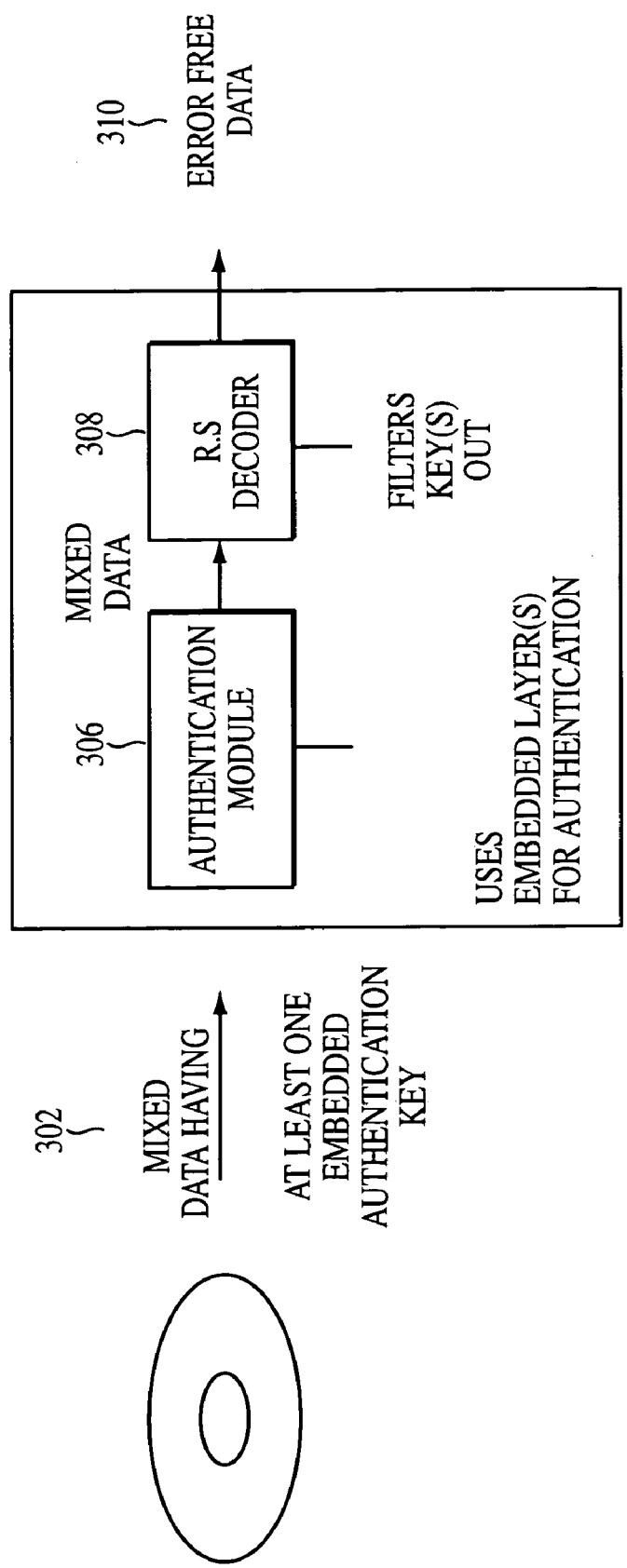
FIG. 23 is a block diagram of a compact disc player according to a ninth embodiment of the invention, used for authenticating data embedded at substantially inaudible levels. The embedded data also contains at least one authentication key or component.

FIG. 23 is an illustration of an exemplary data player used in the process of authenticating a data media and/or mixed data to be stored on a disc. The mixed data contains at least an original data and/or embedded data and/or one embedded authentication key or component. The embedded data and embedded authentication key/component were embedded at substantially inaudible levels using, for example, the embedded signaling encoder illustrated in FIG. 8. The data media may be a data disc or storage, a computer storage or a network of computers having storage capacity, such as the Internet, capable of storing data.

In this embodiment, the data media is a CD 300, which contains data and authentication key(s) embedded during substantially inaudible levels. More specifically, CD 300 contains mixed data 302, which includes an original data, embedded data and at least one embedded authentication key or component. Mixed data 302 is introduced into an authentication module 306 when compact disc 300 is inserted into a data player or CD player 304 of this embodiment.

Authentication module 306 is generally disposed within CD player 304, although it may be optionally be located remote from the actual player device or box. Using the key(s) embedded in mixed data 302, CD player 304 authenticates whether CD 300 is a non-pirated disc. Once CD 300 is authenticated, authentication module 306 transfers mixed data 302 to Reed-Solomon decoder 308 or other standard decoder, which intakes the data, rearranges it, compiles it into a table, performs error correction, and outputs corrected data 310, which is error free data. Newly corrected data 310, which is output from the CD player 304 in a final output signal, contains the original data and embedded data in the form of audio and/or video and/or audio data and/or video data and/or digital data, substantially free of each authentication key or component thereof.

Conventional processing system architecture is more fully discussed in *Computer Organization and Architecture*, by Williams Stallings, McMillan Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2 nd ed. 1992). Each of the foregoing publications is incorporated herein by reference.

Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., "Where Buses Cannot Go", IEEE SPECTRUM, February 1995, pp. 41–45; and Barroso, L. A. et al., "RPM: A Rapid Prototyping Engine for Multiprocessor Systems", IEEE COMPUTER, February 1995, pp. 26–34, all of which are incorporated herein by reference.

In alternate preferred embodiments, the above-identified processor, and in particular microprocessing circuit 158, may be replaced by or combined with any other suitable processing circuits, including programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

The many features and advantages of the invention are apparent from the detailed specification. For example, the present invention applies to CDs, DVDs and all classes of optical disc carriers. Thus, it is intended by the appended claims to cover all such features and advantages of the invention that fall within the true spirit and scope of the invention.

Further, since numerous modifications and variations will readily occur to those skilled in the art, it is not desired to limit the invention to the exact construction illustrated and described. Accordingly, all suitable modifications and equivalents may be resorted to as falling within the scope of the invention.

I claim:

1. An embedded signaling apparatus for embedding data with data medium including audio data, optionally on the data medium, at substantially inaudible levels, said apparatus comprising:
    a processing device configured to receive code signals, at least one of the code signals including the data to be embedded in the data medium;
    an adjust gain device operably connected to said processing device, and configured to adjust said code signals, including at least one of the audio data and the data to be embedded;
    a bit stuffing adder operably connected to said processing device, and configured to transform audio data from a lower bit signal to a higher bit signal;
    a dither generator operably connected to a dither adder and to a dither subtracter;
    a dither adder operably connected to said bit stuffing adder, to said adjust gain device and to said dither generator;
    a dither subtracter operably connected to said dither generator and said dither adder, said dither subtracter configured to receive a composite audio dither signal from said dither adder and to produce a final output signal comprising the audio data and the embedded data, the audio data being substantially audible to a user and the embedded data being substantially inaudible to the user.

2. The embedded signaling apparatus according to claim 1, wherein said dither generator is configured to produce, at predetermined bit rates, dither signals, which are substantially canceled before output of the final output signal.

3. The embedded signaling apparatus according to claim 2, wherein said dither generator is configured to produce a random digital dither signal of substantially equal magnitude that is input each to said dither adder and said dither subtracter.

4. The embedded signaling apparatus according to claim 1, wherein said dither adder is configured to produce said composite audio dither signal having an amplitude substantially proportional to a sum of three input data signals, said composite audio dither signal comprising said audio data and said embedded data.

5. The embedded signaling apparatus according to claim 4, wherein said three input data signals comprise said audio data, a dynamically modified code signal, and a dither signal.

6. The embedded signaling apparatus according to claim 1, wherein said dither subtracter is further configured to receive a dither signal substantially equal in magnitude to the dither signal inputted to said dither adder.

7. The embedded signaling apparatus according to claim 1, wherein said dither subtracter is further configured to subtract from said composite audio dither signal, a dither signal substantially equal in magnitude to the dither signal inputted into said dither adder.

8. The embedded signaling apparatus according to claim 1, further comprising a bit truncation device operably connected to said dither subtracter, said truncation device reducing a bit signal of the final output signal to a lower bit signal comprising said audio data and said embedded data.

9. The embedded signaling apparatus according to claim 1, wherein said embedded data contains at least one authentication key or component thereof, used to prevent at least one of piracy, unauthorized access and unauthorized copying of said data.

10. A method for embedding data into audio signals occurring at substantially inaudible levels, said method comprising the steps of:
   (a) generating or accessing an original audio signal and data to be embedded into said original audio signal;
   (b) transforming the original audio signal from a lower bit signal to a higher bit signal;
   (c) processing at least one of said original audio signal and the embedded data in order to produce a dynamically modified code signal;
   (d) combining said original audio signal, said dynamically modified code signal, and a dither signal to produce a composite audio dither signal;
   (e) removing a dither signal from said composite audio dither signal; and
   (f) outputting a final output signal comprising substantially said original audio signal and the embedded data as at least one of audio, video, audio data, video data and digital data.

11. The method for embedding data according to claim 10, and further comprising the step of converting said original audio signal composed of 16 bits into channel bit patterns composed of 24 bits.

12. The method for embedding data according to claim 10, and further comprising the step of selecting one form of data from a group comprising an optical disc, an electronic file, an intra-network and an inter-network.

13. The method for embedding data according to claim 10, wherein the processing step (c) optionally includes spread spectrum modulation and code signal shaping of at least one of the original audio signal and the data to be embedded.

14. The method for embedding data according to claim 10, wherein the removing step (e) further includes the step of subtracting from said composite audio dither signal, a dither signal substantially equal in magnitude to another dither signal inputted into a dither adder.

15. The method for embedding data according to claim 10, wherein the combining step (d) further includes the step of producing a composite audio dither signal having an amplitude that is at least substantially proportional to a sum of said original audio signal, said dynamically modified code signal and said dither signal.

16. The method for embedding data according to claim 10, further including the step of optionally truncating a bit signal of said final output signal from a higher bit signal to a lower bit signal comprising substantially said original audio signal and said embedded data.

17. The method for embedding data according to claim 10, further including the step of introducing into said embedded data at least one authentication key or component thereof, for preventing at least one of piracy, unauthorized access and unauthorized copying of said embedded data.

18. The method for embedding data according to claim 17, further including the step of authenticating said embedded data via at least one authentication key or component thereof contained in the data embedded during substantially inaudible levels.

19. The method for embedding data according to claim 17, further including the step of authenticating said embedded data via at least two different authentication keys or components thereof contained in said embedded data, wherein each authentication key or component thereof successively must be authenticated before said embedded data is finally output in the outputting step (f).

20. The method for embedding data according to claim 17, further including the step of authenticating said embedded data via an address pointer indicating a specified location on a disc where at least one authentication key or component thereof is located, said address pointer programmable into a table of contents area on said disc.

21. The method for embedding data according to claim 17, further including the step of authenticating said embedded data over a plurality of interconnected computer networks comprising at least one of a local network, global network and Internet.

22. The method for embedding data according to claim 17, wherein the authenticating step further includes the steps of:
   detecting at least one authentication key or component thereof contained within said embedded data;
   comparing the embedded authentication key or component thereof to at least one authentication key, or component thereof; and
   outputting said embedded data as at least one of audio, video, audio data, video data and digital data, substantially free of said at least one authentication key or component thereof, before said embedded data is output in the final output signal.

23. A method for authenticating at least one of a media and data stored on said media in order to prevent at least one of piracy, unauthorized access and unauthorized copying of the data stored on said media, wherein said media contains at least one authentication key or component thereof in data embedded during imperceptibly low inaudible levels, for authenticating whether at least one of said media and the data is authorized, said method comprising the steps of:
   (a) reading the data, including the embedded data, from said media;
   (b) detecting said embedded data including at least one authentication key or component thereof;
   (c) comparing the at least one authentication key or component thereof, to at least one predetermined authentication key or component thereof;
   (d) authenticating the at least one of said media and said data responsive to the comparing step (c); and
   (e) outputting said data as at least one of audio, video, audio data, video data and digital data, including the embedded data, without substantially affecting the at least one of audio, video, audio data, video data and digital data, or the audible characteristics thereof.

24. A method according to claim 23, wherein the step of detecting the embedded data includes the step of deriving the embedded authentication key or component thereof as a combination of on-off binary codes representing ones and zeros to represent a predetermined pattern.

25. A method according to claim 23, and further including the step of locating said embedded data on at least one of a per track basis and interval basis throughout said media such that said authenticating step (d) is performed for at least one of each track to be played, throughout playback and throughout recording.

26. A method according to claim 23, wherein said authenticating step (d) further includes a step of authenticating using a different authentication key or component thereof for each disc track.

27. A method according to claim 23, said method comprises the step of authenticating the at least one of the embedded data and the media via at least two different authentication keys, each of which successively must be authenticated before said embedded data is finally output via said outputting step (f).

28. A method according to claim 23, further including the step of using a process defined in at least one of the reading, detecting, comparing, authenticating and outputting steps, as a multi-level authentication system comprising at least two different authentication keys, each of which successively must be authenticated before said embedded data is output in a final output signal.

29. A method according to claim 23, wherein said method authenticates the at least one of the media and the embedded data over a plurality of interconnected computer networks comprising at least one of a local network, global network and the Internet.

30. A method according to claim 23, wherein said authenticating step (d) further includes a step of using at least three different sources for compiling long or compound authentication keys or components thereof.

31. A method according to claim 23, wherein the deriving step further comprises the step of at least one of decoding and decrypting the embedded authentication key or component thereof.

32. A method according to claim 23, wherein said comparing step (c) further comprises the step of comparing an authentication key or component thereof contained in said embedded data, to a table of valid authentication keys or components thereof.

33. A method according to claim 23, wherein the embedded data includes information on at least one of a music originator, a music title, group of music titles, lot number, batch number, shipper, recipient, shipping date, manufacturer identity, manufacturing date and designated data purpose.

34. In a method for authenticating at least one of a media and data stored on said media in order to prevent at least one of piracy, unauthorized access and unauthorized copying of the data stored on said media, a data disc comprises media that contains at least one authentication key or component thereof in data embedded during substantially inaudible levels and substantially corresponding to audible levels of the data, for authenticating whether at least one of said media and the data is authorized, wherein said authenticating optionally occurs on at least one of a per track basis and interval basis throughout said media, and at least one authentication key or component thereof does not substantially interfere with said data when output.

35. In a method for authenticating at least one of a media and data to be stored on said media in order to prevent at least one of piracy, unauthorized access and unauthorized copying of the data stored on said media, a data message comprises media that contains at least one authentication key or component thereof in data embedded during substantially inaudible levels and substantially corresponding to audible levels of the data, for authenticating whether at least one of said media and the data is authorized, wherein said authenticating optionally occurs on at least one of a per track basis and interval basis throughout said media, and said at least one authentication key or component thereof does not substantially interfere with said data when output.

36. An embedded signaling encoder for embedding data into audio signals occurring at substantially inaudible levels, and useful for authenticating at least one of a media and data stored on said media in order to prevent at least one of piracy, unauthorized access and unauthorized copying of the data stored on said media, wherein the embedded data contains at least one authentication key or component thereof, said embedded signaling encoder comprising:

(a) processing means for receiving and frequency analyzing code signals, at least one of which includes the data to be embedded;

(b) adjusting means for adjusting the frequency analyzed code signal in producing a dynamically modified code signal;

(c) bit stuffing adding means for transforming an original audio signal from a lower bit signal into a higher bit audio signal;

(d) dither generating means for generating at least two random digital dither signals, each of substantially equal predetermined bit rate and each of substantially equal magnitude, as input signals;

(e) dither adding means for combining the original audio signal, the dynamically modified code signal and the dither signal, and for producing a composite audio dither signal; and (f) a dither subtracting means for removing the dither signal from said composite audio dither signal, and for producing a final output signal comprising substantially the original audio signal and the embedded data.

37. The embedded signaling encoder according to claim 36, wherein said processing means optionally performs spread spectrum modulation and code signal shaping of at least one of the original audio signal and data to be embedded.

38. The embedded signaling encoder according to claim 36, wherein said dither adding means further produces a composite audio dither signal having an amplitude that is substantially proportional to a sum of said original audio signal, said dynamically modified code signal and said dither signal.

39. The embedded signaling encoder according to claim 36, further comprising truncating means for reducing a bit signal of said final output signal from a higher bit signal to a lower bit signal comprising substantially said original audio signal and said embedded data.

40. A method of embedding first data of a first bit length within second data of a second bit length and transmitting the first and second data in a data stream, said method comprising the steps of:

(a) combining third data of a third bit length with the second data of the second bit length into fourth data of a fourth bit length, the fourth bit length substantially comprising the combined lengths of the second and third bit lengths;

(b) encoding the second data into fifth data of a fifth bit length of a substantially similar length as the second bit length;

(c) gain adjusting the fifth data into sixth data of a sixth bit length of a substantially similar length as the second bit length;

(d) combining the sixth data, the fourth data and seventh data of a seventh bit length of a substantially similar length as the fourth bit length into eighth data;

(e) subtracting the seventh data from the eighth data producing ninth data of a ninth bit length of a substantially similar length as the fourth bit length and including the first data embedded therein;

(f) truncating the ninth data into tenth data of a tenth bit length having a length substantially similar to the second bit length and included the first data embedded therein; and (g) outputting the tenth data with the first data in the data stream.

41. A method of embedding first data of a first bit length within second data of a second bit length and transmitting the first and second data in a data stream, comprising the steps of:

(a) combining third data of a third bit length with the second data of the second bit length into fourth data of a fourth bit length, the fourth bit length substantially comprising the combined lengths of the second and third bit lengths;

(b) encoding and adjusting the second data into fifth data of a fifth bit length of a substantially similar length as the second bit length;

(c) dithering the fifth data with sixth data of a sixth bit length of a substantially similar length as the fourth bit length into seventh data of a seventh bit length of a substantially similar length as the fourth bit length;

(d) truncating the seventh data into eighth data of an eighth bit length having a length substantially similar to the second bit length and included the first data embedded therein; and (e) outputting the eighth data with the first data in the data stream.

42. In a method for authenticating at least one of a media and data stored on said media in order to prevent at least one of piracy, unauthorized access and unauthorized copying of the data stored on said media, wherein at least one authentication key or component is included with data embedded at inaudible levels and stored in mixed data on said media, for authenticating whether the at least one of said media and embedded data is authorized, a data player comprising a data processor performing the steps of:

(a) reading mixed data, which includes original data and embedded data, from the media;

(b) detecting bits from said media;

(c) detecting the embedded data containing at least one authentication key or component thereof responsive to the step of detecting bits from the media;

(d) comparing the embedded authentication key or component to at least one authentication key or component thereof;

(e) authenticating at least one of said media and said embedded data responsive to said comparing step (d);

(f) removing the embedded authentication key or component thereof from the mixed data; and (g) outputting said mixed data, comprising substantially the original data and embedded data, as at least one of audio, video, audio data, video data and digital data substantially free of each authentication key or component thereof, in a final output signal.

43. In the data player comprising the data processor according to claim 42, the outputting step (g) further including the step of converting said embedded data into an audio analog signal and audio without transferring, in the embedded data, the embedded authentication key or component thereof.

44. The data player comprising the data processor according to claim 42, further including a step of locating said embedded data on at least one of a per track basis and interval basis throughout said media such that said authenticating step (e) is performed for at least one of each track to be played, throughout playback and throughout recording.

45. In the data player comprising the data processor according to claim 42, said authenticating step (e) further including a step of authenticating using a different authentication key or component thereof for each disc track.

46. The data player comprising the data processor according to claim 42, further including a step of authenticating the at least one of the embedded data and the media via at least two different authentication keys or components thereof, each of which successively must be authenticated before said embedded data is finally output via said outputting step (g).

47. The data player comprising the data processor according to claim 42, further including a step of using a process defined in at least one of the reading, detecting, comparing, authenticating, removing and outputting steps, as a multi-level authentication system containing at least two different authentication keys or components thereof, each of which successively must be authenticated before said embedded data is finally output in a final output signal.

48. The data player comprising the data processor according to claim 42, further including a step of authenticating using at least three different sources for compiling long or compound authentication keys or components thereof.

49. In the data player comprising the data processor according to claim 42, said comparing step (d) further comprises a step of comparing an authentication key or component thereof contained in said embedded data, to a table of valid authentication keys or components thereof.

50. In a method for authenticating at least one of a media and data stored on said media, in order to prevent at least one of piracy, unauthorized access and unauthorized copying of the data stored on said media, a data disc comprises the data that contains at least one authentication key or component thereof in data embedded during substantially inaudible levels and substantially corresponding to audible levels of the data, for authenticating whether at least one of said media and the data is authorized, wherein the at least one authentication key or component thereof is substantially inaudible and is of a first amplitude substantially corresponding to a second amplitude of an audio signal of the data, thereby increasing the audio signal of the data to a higher decibel level.

51. In a method for authenticating at least one of a media and a data to be stored on said media in order to prevent at least one of piracy, unauthorized access and unauthorized copying of the data stored on said media, a data message containing at least one authentication key or component thereof embedded at substantially inaudible levels and substantially corresponding to audible levels of the data, for authenticating whether the data message or media is authorized, wherein the at least one authentication key or component thereof is substantially inaudible and is of a first amplitude substantially corresponding to a second amplitude of an audio signal of the data message, thereby increasing the audio signal of the data message to a higher decibel level.

* * * * *